United States Patent [19]

Enomoto

[11] Patent Number: 5,895,459
[45] Date of Patent: Apr. 20, 1999

[54] INFORMATION PROCESSING DEVICE BASED ON OBJECT NETWORK

[75] Inventor: Hajime Enomoto, Funabashi, Japan

[73] Assignee: Fujitsu Limited, Kawasaki, Japan

[21] Appl. No.: 08/810,671

[22] Filed: Mar. 3, 1997

[30] Foreign Application Priority Data

Mar. 5, 1996 [JP] Japan ................................. 8-046980
Feb. 13, 1997 [JP] Japan ................................. 9-029457

[51] Int. Cl.$^6$ ........................................ G06F 15/00
[52] U.S. Cl. ............................ 706/10; 345/335; 706/11
[58] Field of Search ........................... 704/9; 706/10, 706/11; 345/335

[56] References Cited

U.S. PATENT DOCUMENTS 4,975,865  12/1990  Carrette et al. ................ 706/10
5,682,542  10/1997  Enomoto et al. ................ 707/516
5,795,297   8/1998  Daigle .......................... 600/447

FOREIGN PATENT DOCUMENTS 5-233690  9/1993  Japan .................. G06F 15/38
7-295929  11/1995  Japan .................. G06F 15/00

OTHER PUBLICATIONS

R. Kozierok and P. Maes, "A Learning Interface Agent for Scheduling Meetings." Proc. Int'l. Workshop on Intelligent User Interfaces, pp. 81–88, Dec. 1993.

P. Maes and A. Wexelblat, "Interface Agents." Proc. of the CHI Dec. 1996 Conference Companion on Human Factors in Computing Systems, pp. 369–370.

Primary Examiner—Robert W. Downs
Attorney, Agent, or Firm—Staas & Halsey

[57] ABSTRACT

An information processing device for processing information based on object networks, each of which represents data and processing of the data as objects in a graph. The information processing device includes a data management system for controlling a set of data which defines a system hierarchy in terms of relations between data models, object models, role models, and process models, the data models representing attribute-value structures by using template-format schema, the object models representing the objects by dividing the objects into formal models and feature models in a hierarchy based on template formats of the data models, the role models representing a structure body of object networks, the process models each corresponding to an object network which represents noun objects as nodes and verb objects as branches in a graph with a function of a given verb object being applied to a given noun object at a given node to obtain a target noun object located down on a branch corresponding to a name of the given verb object. The information processing device further includes an operation control system for controlling processes to proceed by effecting inter-model connections while checking constraints placed on the models based on the set of data controlled by the data management system.

12 Claims, 23 Drawing Sheets

| ID | NAME | X | Y | L | Lx | Ly | Cx | Cy | POINTER DATA |
|----|------|---|---|---|----|----|----|----|--------------|

INFORMATION PROCESSING DEVICE BASED ON OBJECT NETWORK

BACKGROUND OF THE INVENTION

1. Field of the Invention

The present invention generally relates to devices which treat data and processing of the data as objects, and process information by using object networks expressing the objects in a graph. The present invention particularly relates to an information processing device which defines system constraints in terms of inter-object relations in the object network to control the constrained processing.

2. Description of the Prior Art

Information processing systems such as those directed to a specific application field allow system designers to easily build systems by modeling the systems as an object network. Such systems may be designed to provide users in the specific application field with clear descriptions of system conditions and executable operations. Japanese Patent Laid-open Application No. 5-233690 discloses one of such systems, and is entitled "Language Processing System based on Object Network" (a disclosure of which is hereby incorporated by reference).

This processing system classifies objects into noun objects and verb objects, and builds a reference model as an object network which represents the noun objects as nodes and the verb objects as branches. In this reference model, a function of a verb object is applied to a noun object at a given node to obtain another noun object as a target object when this later noun object is located down on a branch having the name of that verb object. An information processing mechanism to achieve this operation is provided in this processing system.

FIG. 1 is an illustrative drawing showing an object network for image drawing processing. In FIG. 1, "None", "Point", "Point seq", "Line", etc., represent noun objects, and "define", "draw up", etc., represent verb objects.

Take an example of drawing a picture on a display. There is nothing on the display at an initial state. Then, a selection of a point is made on the display by a mouse or the like to move into a next state where the point is drawn. Selection of several points achieves a state where a series of the points is formed on the display.

Such data as a point and a series of points are treated as noun objects. A verb object (e.g., define) is applied as a function to a noun object (e.g., Point) to obtain a target noun object (e.g., Point seq.). In this manner, each state of the data of the drawing objects is provided at a node as a noun object, and verb objects represent branches between the nodes to create an object network as shown in FIG. 1. Such an object network enables construction of an image processing system for drawing pictures.

Japanese Patent Laid-open Application No. 7-295929 (a disclosure of which is hereby incorporated by reference) discloses an interactive image information device based on a common platform function. The common platform function is aimed at prompting effective processing in an object network through interactions between a client and a server. To this end, the common platform function displays items of visualization targets, as well as instructions and data which the user intends to use. Further, the common platform is provided with various windows for displaying results from server executions, and a communication manager in the common platform mediates between the client and the server in terms of a data display format or the like.

The present invention develops and expands the functions of the language processing system based on the object network disclosed in Japanese Patent Laid-open Application No. 5-233690 and of the interactive information processing device based on the common platform function disclosed in Japanese Patent Laid-open Application No. 7-295929. In so doing, the present invention sets an object to provide a system which enables easy development of applications having visualization functions, interactive functions, and cooperative functions.

Accordingly, there is a need for a system which enables easy development of applications having visualization functions, interactive functions, and cooperative functions.

Further, there is a need for a mechanism which relates constraint processing with the concept of a model to reveal a software structure as well as definitions of data and constraints and to clearly define inter-object relationships in a specified application field, and, thus, establishes a clear connection between object relationships and created processes.

SUMMARY OF THE INVENTION

Accordingly, it is a general object of the present invention to provide a system which satisfies the needs described above.

It is another and more specific object to provide a system which enables easy development of applications having visualization functions, interactive functions, and cooperative functions.

It is yet another object to provide a mechanism which relates constraint processing with the concept of a model to reveal a software structure as well as definitions of data and constraints and to clearly define inter-object relationships in a specified application field, and, thus, establishes a clear connection between object relationships and created processes.

In order to achieve the above objects according to the present invention, an information processing device for processing information based on object networks, each of which represents data and processing of the data as objects in a graph, includes a data management system for controlling a set of data which defines a system hierarchy in terms of relations between data models, object models, role models, and process models, the data models representing attribute-value structures by using template-format schema, the object models representing the objects by dividing the objects into formal models and feature models in a hierarchy based on template formats of the data models, the role models representing a structure body of object networks, the process models each corresponding to an object network which represents noun objects as nodes and verb objects as branches in a graph with a function of a given verb object being applied to a given noun object at a given node to obtain a target noun object located down on a branch corresponding to a name of the given verb object. The information processing device further includes an operation control system for controlling processes to proceed by effecting inter-model connections while checking constraints placed on the models based on the set of data controlled by the data management system.

The operation control system defines the constraints in terms of inter-object relationships within the object network, and controls the procedure of processing the constraints. These constraints include AND constraints which pose restrictions on relations between attributes of a noun object and allow a state transition only when all the necessary attributes are obtained. Also included are OR constraints which are constraints between verb objects when starting from a given noun object, and allow parallel executions of the verb objects while keeping independency between them. Another type of constraints are hierarchy constraints, indicating that a set of attributes of a current upper-level object is subjected to a matching operation through an operation on a lower-level object, as specified by relationships between the upper-level object and the lower-level object in a procedure of processing the object network. The operation control system controls the execution of the process based on the above-mentioned constraints.

The information processing device of the present invention uses the data models, the object models, and the process models, and relates these models based on rules mainly comprised of constraints, so that steps of execution processing are defined in a model-driven manner, thereby providing a user-friendly system and allowing the experts to easily design the system.

Other objects and further features of the present invention will be apparent from the following detailed description when read in conjunction with the accompanying drawings.

DESCRIPTION OF THE PREFERRED EMBODIMENTS

In the following, a principle and embodiments of the present invention will be described with reference to the accompanying drawings.

Figure 2:
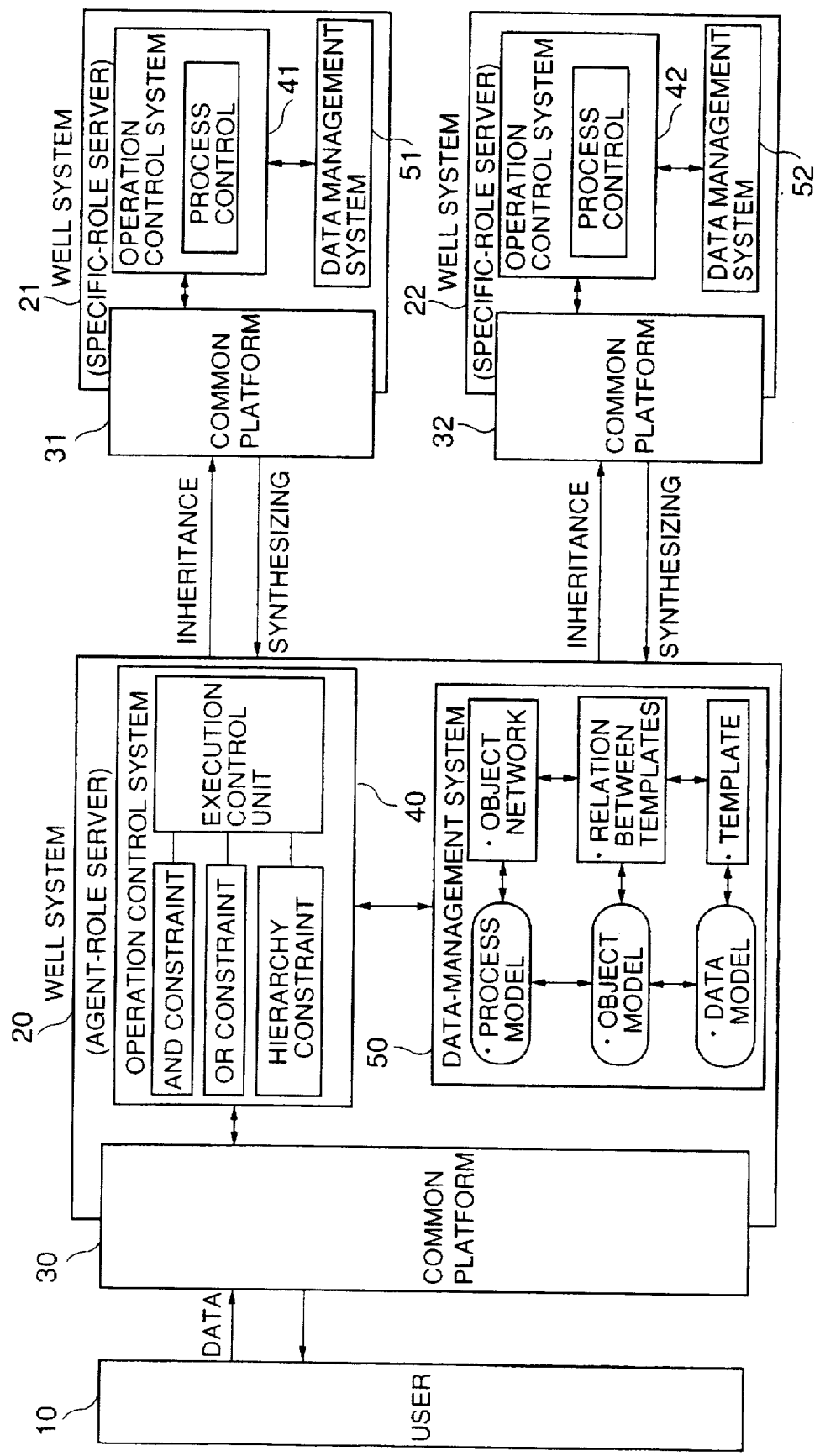
FIG. 2 is a block diagram of a system according to a principle of the present invention.

FIG. 2 is a block diagram of a system according to a principle of the present invention.

In FIG. 2, a user (client) 10 provides data and instructions for the present system. WELL systems 20, 21, and 22 are based on the language system of the WELL (window-based elaboration language) which treats data and processing of the data as objects, and processes information by using an object network representing these objects in a graph. Common platforms 30, 31, and 32 provide interfaces between the WELL systems as well as between the WELL systems and the user. Operation control systems 40, 41, and 42 control processes based on the object network. Data-management systems 50, 51, and 52 manage data relating to the object network.

In particular, the WELL system 20 is an agent-role server equipped with an agent function for preparing service plans according to intentions of the user 10. The WELL systems 21 and 22 are specific-role servers which carry out the service plans prepared by the agent-role server.

The data-management system 50 maintains data, which defines a system hierarchy in accordance with process-model relationships associated with the object network. Data models represent attribute structures in schema of template formats, and object models represent objects by classifying these objects into formal models and feature models in a hierarchy based on the template formats of the data models. The object network includes noun objects provided at nodes and verb objects representing branches. In this object network, a function of a verb object is applied to a noun object at a given node to obtain a target noun object when this target noun object is positioned down on the branch having the name of that verb object.

The operation control system 40 has a control means for controlling a process to proceed by performing inter-model connections while checking constraints posed on the models based on the data of the data-management system 50.

The data-management systems 51 and 52 and the operation control systems 41 and 42 in the WELL systems 21 and 22, respectively, perform the same functions described above. However, the WELL systems 21 and 22 operate as specific-role servers for processing information based on object networks specifically tailored to individual services.

The operation control system 40 processes data and constraints by using the same processing method in the system, and requests services from the user 10 with respect to the data and services from the specific-role servers (the WELL systems 21 and 22) with respect to the constraints. A process is proceeded after the data and the constraints are obtained through the operations responding to these requests.

Further, the operation control system 40 defines the constraints in terms of inter-object relationships within the object network, and controls the procedure of processing the constraints. These constraints include AND constraints which pose restrictions on relations between attributes of a noun object and allow a state transition only when all the necessary attributes are obtained. Also, OR constraints are constraints between verb objects when starting from a given noun object, and allow parallel executions of the verb objects while keeping independency between them. Another type of constraints are hierarchy constraints, indicating that a set of attributes of a current upper-level object is subjected to a matching operation through an operation on a lower-level object, as specified by relationships between the upper-level object and the lower-level object in a procedure of processing the object network. The operation control system 40 controls the execution of the process based on the above-mentioned constraints.

In designing the object network for rendering services, a process model can be defined to carry out a process based on a configuration of the constraints. This configuration is created by displaying information on the constraints based on a model available in the system, and by allowing reference to be made to the displayed constraints through a means for making these constraints usable.

It is possible to structure a plurality of the agent-role servers such as WELL systems 20 through 22 in a hierarchical configuration. In such a case, an upper agent-role server treats a lower agent-role server as a specific-role server. This configuration allows an agent-role server to control a specific-role server according to the hierarchical structure of the model.

Figure 3:
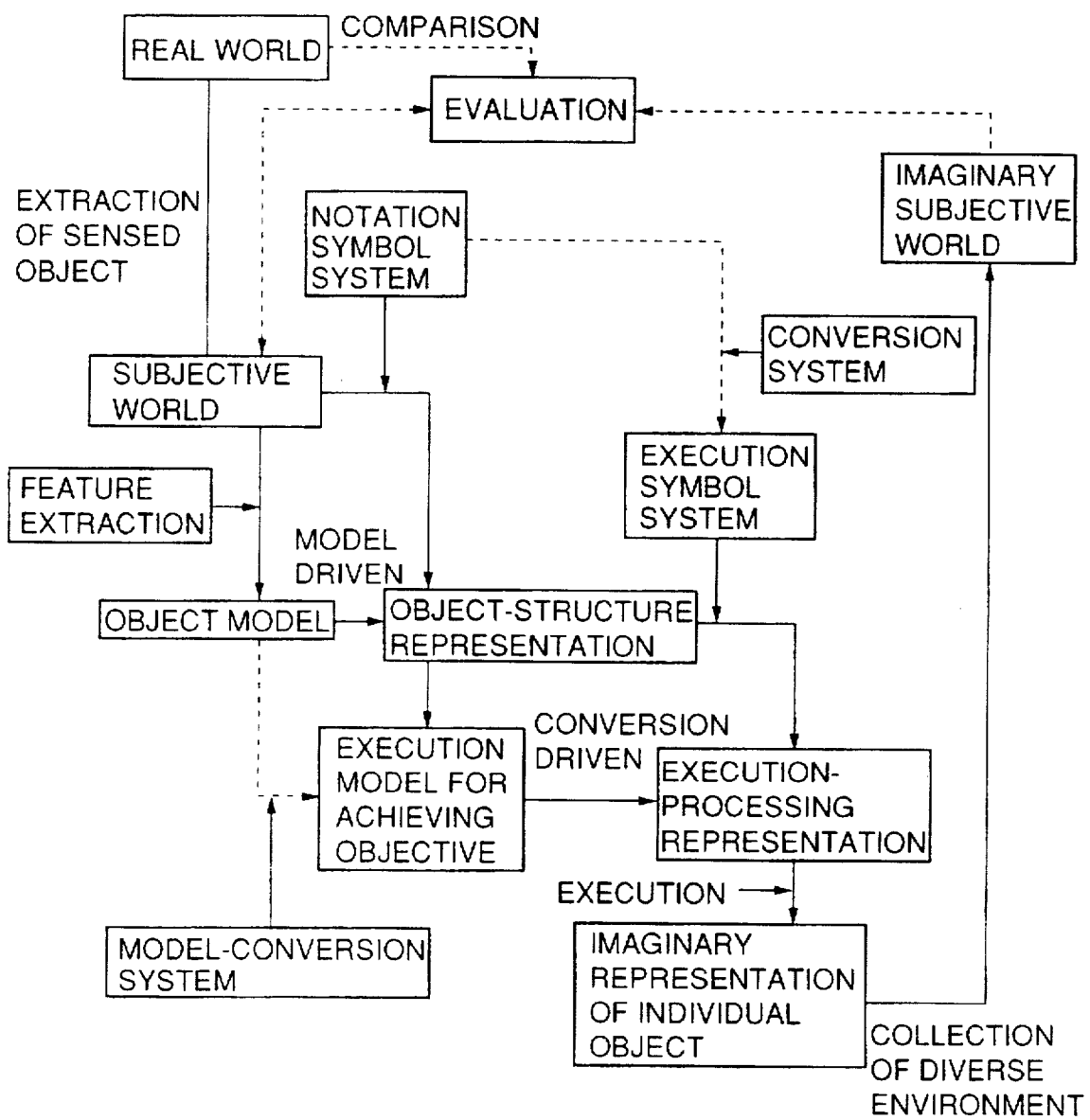
FIG. 3 is an illustrative drawing showing relations between the real world and a subjective world created in a mind as a reflection of the real world.

In the following, concepts of objects treated by the system of the present invention will be described. FIG. 3 is an illustrative drawing showing relations between the real world and a subjective world created in a mind as a reflection of the real world.

In the real world, many objects move dependently or independently with each other. Human beings sense the real world with their five senses, and have interests, recall and imagine things, and have dreams. Through these activities, only a small portion of the real world is reflected in the subjective world. This reflection is different from the real world, and is merely a virtual existence which human beings can only recognize, make reference to, and indicate without going beyond a scope of mental activities. A rise in a cognition level toward increased logical details makes communications between human beings more effective. As a result, different groups having common interests can acquire the same knowledge and form harmonized opinions.

For the above process to proceed, an object model and an execution model for achieving objectives become necessary. The WELL system disclosed in Japanese Patent Laid-open Application No.7-295929 is referred to as an extensible WELL system since it has a capacity to expand in coping with various object networks. A specific object of the present invention is to relate constraint processing with model concepts in the WELL system so as to describe definitions of data and constraints as well as software structure and to clearly define inter-object relationships in a specific application field, and, then, provide a means for establishing a connection between the object relationships and the process to be created. Here, the real world in the specific application field does not completely coincide with the subjective world, since the subjective world is merely a virtual representation. Because of this, it should be easy to make modifications to software in an interactive manner in the process of developing software.

In creating a model, the concept of objects used in the field of software is employed. With use of the object concept, data and constraints can be treated in the same manner.

In the following, data and constraints will be described.

Data is represented in mathematical terms as input parameters and output parameters of functions. In the system, data names are attribute names of noun objects, and data values are values of the attributes. In the data defining process of the WELL system, there are two different stages. One is a defining process to prepare a template corresponding to a name of a noun object, and the other is a define operation to determine values and set these values into respective positions in the template. A verb object applies a function to a noun object. A noun case includes a common-noun case and a proper-noun case. An article {a, the} gives a direction in which reference is made and data values are determined, thereby defining generality and definiteness of the noun.

Modification is made by adjectives and adverbs. Modifications of a generic noun has a half-definite order according to constraint priority. For example, if "featured" and "colored" are compared, the constraint priority is given to these terms in this order.

When an object represented by a name $\alpha$ has a characteristic denoted as $\tau$, the notation "$\tau\{\alpha\}$" is used as in the valency aid nomenclature according to the notation of the intensional logic. This notation means that the object denoted as a has a characteristic denoted as $\tau$. Accordingly, a set of predicates P{j} defines an object {j}.

Figure 1:
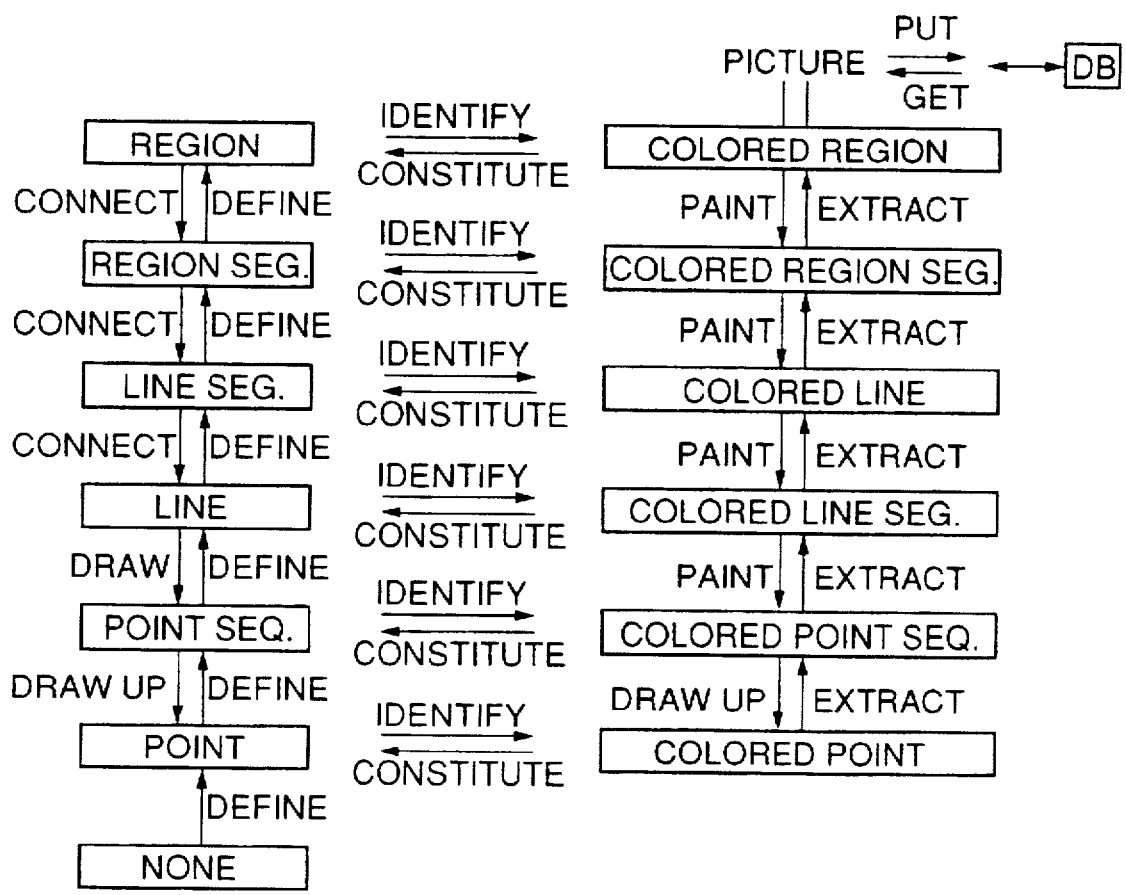
FIG. 1 is an illustrative drawing showing an object network for image drawing processing.

For example, when a list of line segments defines lines as shown in the object network of FIG. 1 and a drawing process is underway, "painted by {the identified Colored line}" is equal to "|the list of Colored line seg.|," and "the Colored line seg." obtained during this process gives a final result. Although characteristics of the constraints are defined by intensional equalities, elements having extensional characteristics are treated as follows.

"Symmetrical element {an identified element}" intensionally provides characteristics of a counterpart element in the symmetry. Extensionally, however, the counterpart element should be retrieved from a database.

As described above, specific attribute values are regarded as data, and characteristics of generic objects are considered as constraints. In terms of the processing system, the data is determined by the client, and the constraints are determined with respect to their contents as services, with the same types of treatments applied to the data and the constraints. That is, the data and the constraints are treated as only having a difference in the notation between small parentheses and a medium parentheses.

For all the stages of software development from assessment of requirements, design of specifications, implementation, to evaluation, a common language system usable by everybody involved should be provided. As such a common language system, the extensible WELL disclosed in Japanese Patent Laid-open Applications No.5-233690 and No.7-295929 is employed. This language system has features that it uses words and sentences of a natural language, displays an object network on a common platform shared by the user and the server so as to visualize relationships between the words, and allows manipulation of these relationships to carry out specific operations for achieving objectives. A further feature is that this language system displays the constraints in the form of equations or short sentences, so that the users can use the server to carry out intended operations without creating specific programs.

In order to make an effective use of this language system and interactive functions, a model structure as follows is provided.

In what follows, classification and a structure of the model will be described.

Each of nouns, verbs, and modifiers such as adjectives and adverbs has its own template. One template is connected with another template for modification to carry out an integration process. To achieve this, the following model is created.

(1) data model

In the language system of WELL (window-based elaboration language), attribute structures are represented by schema having a template format. Based on this data model, management of object notation formats, data manipulation, etc., are carried out. In this manner, data control is achieved to relate each object to a process.

By taking into consideration noun objects, verb objects, and modifier objects (adjectives and adverbs) as different data cases, a connection with a pseudo-natural language format TELL is provided.

(2) object model

An object model is represented by a formal model and a feature model in a hierarchy according to the data model.

(a) formal model

With regard to an image, for example, 3-D structures and motion are formatted by templates as data models based on points, lines, and areas of the image, and, then, formal representations are provided for all the pattern items. Reflections, refractions, and relations between a plurality of objects such as occlusion due to relative positions with respect to a viewpoint are treated as new objects, and are represented by templates as formal models. In this manner, formal models create semantic representations. In the case of an image, formal models correspond to geometric models.

Formal models of verb objects have noun object names as state constraints when these noun object names should be inherited as preconditions for starting data manipulation.

Further, the formal models of verb objects have template portions for indicating constraint names, in-conditions as constraints during an operation, and post-conditions as constraints after the operation. These constraints are combined with indicated constraints added as names to noun objects so as to define relations between generic objects and specific objects.

(b) feature model

Features are represented based on attribute values of a noun object, and show invariability to some extent to changes in the environment. An example of this is dividing lines in a face image, which is divided into areas by these dividing lines, with each element such as eyes, a nose, and a mouth arranged in a respective one of these areas. Highlight lines have similar characteristics, and play an important role in 3-D representation.

Feature models regarding movement are created based on verb objects representing motion itself and noun objects to move.

(c) sensibility model

Sensibility models are used for incorporating sensibilities of humans into formal models and feature models. For this purpose, names and modification parameters are indicated each time as sensibility words with an option to change them.

(3) process model

Noun objects and verb objects are represented as processes, and are expressed in a graph as an object network. The design is made by an expert client, and a graph-structure editor of WELL can help to drive the system.

Further models are necessary to bring about cooperation and integration between processes which are handled by the agent-role servers and specific-role servers. As formal models, a configuration of interactions between individual processes is defined. Since relations and other specifics between the agent-role servers and the specific-role servers are disclosed in Japanese Patent Laid-open Application No.7-295929, only a simple description of these will be provided below.

Requests for services are made by using request and respond commands with inheritance data and constraints. Each service basically makes an execution report by providing synthesized data and constraints as an execution result, and is formatted by using a role concept in order to achieve an effective cooperation. As in the previous case, feature models described in the following can be used with the above-mentioned formal models.

Feature models are used for adding constraint functions to role functions according to the environment, and are defined as operation models for achieving objectives.

As previously described, an example of formal models of objects is geometric models in the case of images.

Models for scaler data and models for vector data become necessary in order to create geometric models, and, then, structure models are created for objects. In an example in the following, however, areas are defined for individual elements constituting the object. Individual elements are eyes, a nose, a mouth, ears, etc., in a human face, and each of them has its own dominating area. Eye brows, for example, are under partial constraints as the eye brows should be positioned over the dominating areas of eyes. Further, contiguous relations between the dominating areas should be satisfied as constraints.

Figure 4A:
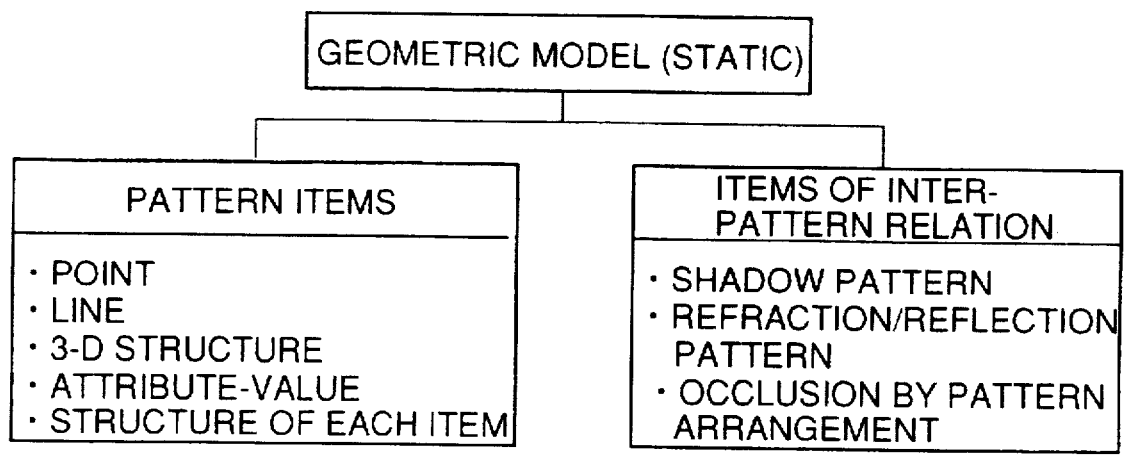
FIGS. 4A and 4B are illustrative drawings showing examples of formal models.
Figure 4B:
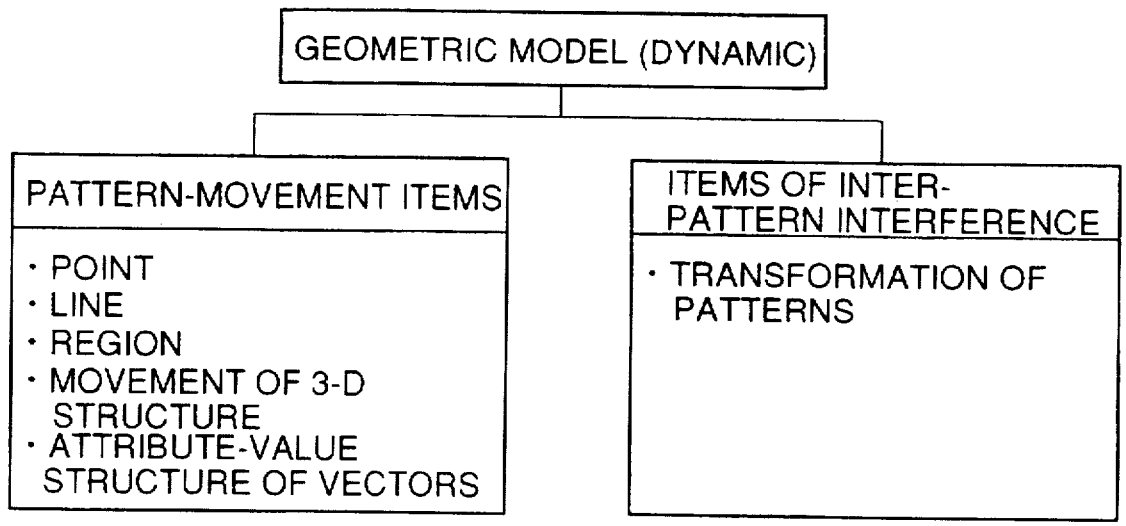

The real world is mapped onto the subjective world when interests are aroused to create an intention. Mapping is started from individual objects, and expanded to a portion of the real world. During this process, the above-mentioned object models are structured in terms of geometry as shown in FIGS. 4A and 4B, developing from primitive data levels. FIGS. 4A and 4B are illustrative drawing showing examples of geometry models which are formal models for images.

After the geometry models are created, a stationary picture is drawn by starting from the drawing of points. Then, movement of the points over the passage of time is defined in the stationary picture to draw moving pictures.

However, structures of objects should be constructed over the geometry models in order to build an image database. The inventor of the present invention has shown that structure lines as follows can be derived from invariability equations in the geometry models. These structure lines are:

feature lines (ridges and furrows), dividing lines (dividing lines between a concave mode and a convex mode), contour lines (edge lines), and highlight lines.

Among these lines, dividing lines have relatively small changes in topological structures when an image is transformed by form changes of objects. Contour lines do not lose a characteristic of a single area if these contour lines represent an outline of an object. On the other hand, topological structures of feature lines are susceptible to even a small degree of transformation. This is partly because creation and elimination of minimum or maximum points are easily brought about while these minimum or maximum points necessarily constitute intersections of the feature lines.

Based on the above considerations, a contour line forming an edge outline of an object is used for extracting an object area, and feature processing or picture drawing is carried out by attaching importance to dominating areas defined by the dividing lines. As for moving pictures, various transformations are represented based on the dominating areas.

In this manner, geometric feature models are defined based on a structure-line theory briefly described above in view of the invariability of features sustained to some extent against changes in the environment.

Further, contiguous relations between individual elements constituting an object should be provided as a feature model, and are used for representing sensibility features of the object. That is, the contiguous relations which are invariable between dominating areas of individual elements experience dynamic changes, and these dynamic changes represent the sensibility features of the object. Assuming that the dynamic changes in the dominating areas themselves and relations between the dominating areas constitute the sensibility features, the feature models will be represented as shown in FIG. 5.

Figure 5:
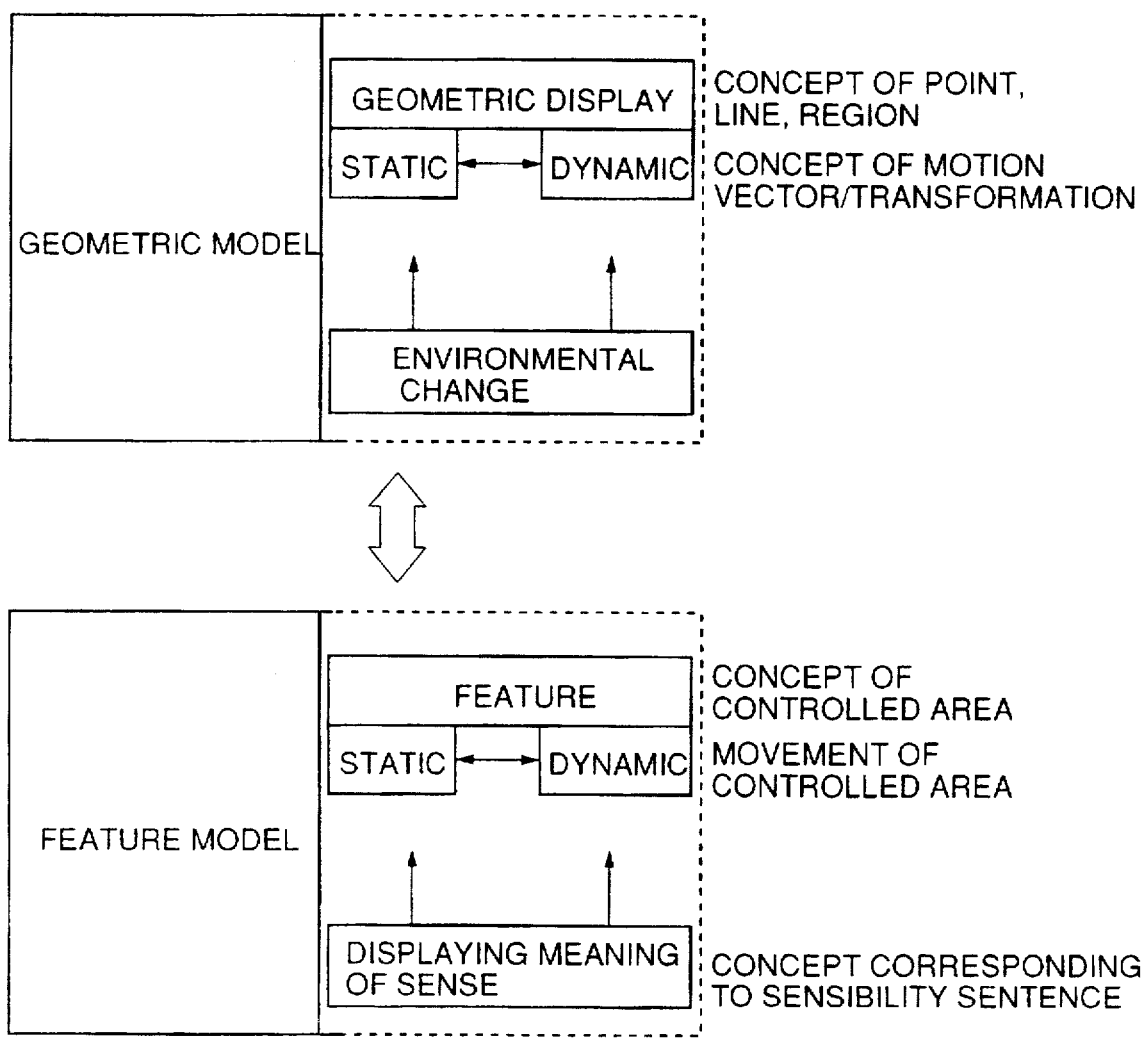
FIG. 5 is an illustrative drawing for explaining a structure of a feature model.

FIG. 5 is an illustrative drawing for explaining a structure of a feature model. In FIG. 5, a direction from a geometric representation to a sensibility meaning representation corresponds to a drawing process, and a direction from the sensibility meaning representation to the geometric representation is a process of processing features in an image. With respect to points and lines in the geometric representation, feature points, edge lines, dividing lines, and highlight lines which express primitive features are represented by constraints on the structure-line features.

What is described of the geometric model in the above relates to features of convex and concave arrangements in a 2-dimensional plane. In addition, function values of an attribute value or a set of attribute values are invariable in space and time, and this characteristic can be also regarded as features. For example, when a speed of object movement is relatively constant over the time, a change in the speed can represent one of the features. By the same token, boundaries between areas each having a constant luminance value can be treated as a feature such as edges or structure-expansion-type edges.

The object model shown in FIG. 3 defines a process which is executed by constraints, i.e., the above-mentioned characteristics. Humans can understand representations of object structures based on linkages of concept structures shown in FIGS. 4A and 4B. In conducting computer-based processing, however, execution models for achieving objectives are necessary in order to allow a computer to carry out specific processing for achieving the objectives.

In order to connect the object models with the process models, a simple transformation process is necessary to transform representations between object structures and processing executions. Such connections between the models are defined by rules of constraints as described in the following. In this manner, an effective operation of the system can be achieved based on an interactive control system for a set of these rules.

In the following, connections between models will be described.

Process execution processing is carried out based on data models. In principle, data is given by the client. The contents of constraints are either defined within the models or set by the client according to the environment. The constraints include the following types.

(a) AND constraints

AND constraints are provided between attribute values of noun objects.

The following constraints are provided between a plurality of verb objects associated with a given noun object.

(b) OR constraints (independency)

OR constraints are provided between indications to a plurality of items which belong to a given noun object, and provided between verb objects originating from the given noun object.

(c) hierarchy constraints

According to relationships between upper-level objects and lower-level objects in the processing procedure of the object network, a set of attribute values of a current upper-level object is subjected to a matching operation by an operation on a lower-level object. When attribute values of a noun object are changed by an operation of a verb object, a set of noun objects located in higher levels will receive a matching operation.

(d) priority constraints

Priority between modifiers and priority between roles in a process are defined.

Regarding proceedings of a process as an interactive process, the inter-model connections are carried out by the following:

visualization of a process operation→object network, interactions with the client→centralization of information on the common platform, role allocations to the user client and the expert, and effective notation of a cooperative process→control of role functions.

To this end, the common platform receives data and constraints relevant to the user, and an object network shown on a display is used for controlling the proceedings of the process.

Figure 6:
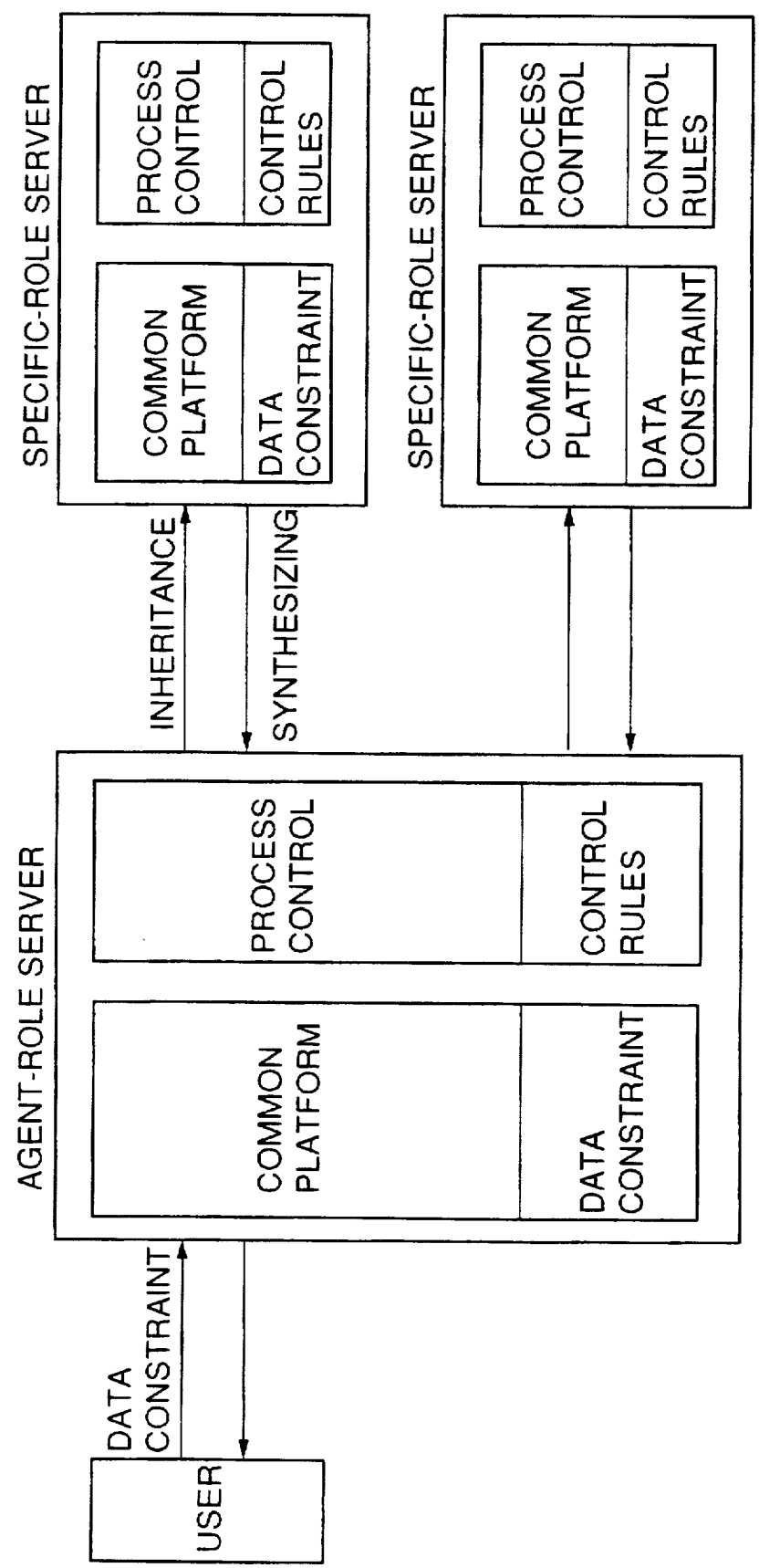
FIG. 6 is an illustrative drawing showing the proceedings of execution processing in the system of the present invention.

FIG. 6 is an illustrative drawing showing the proceedings of execution processing in the system of the present invention. The execution processing in an object network is carried out on a request-and-respond basis. Control rules governing inheritance and synthesis of processes and data are managed as shown in FIG. 6, including priority of the processes.

As described above, the inter-model connections are carried out by constraint rules between various types of models of data, objects, and processes. By doing so, the execution processing is controlled in a specific manner.

Figures 7, 8:
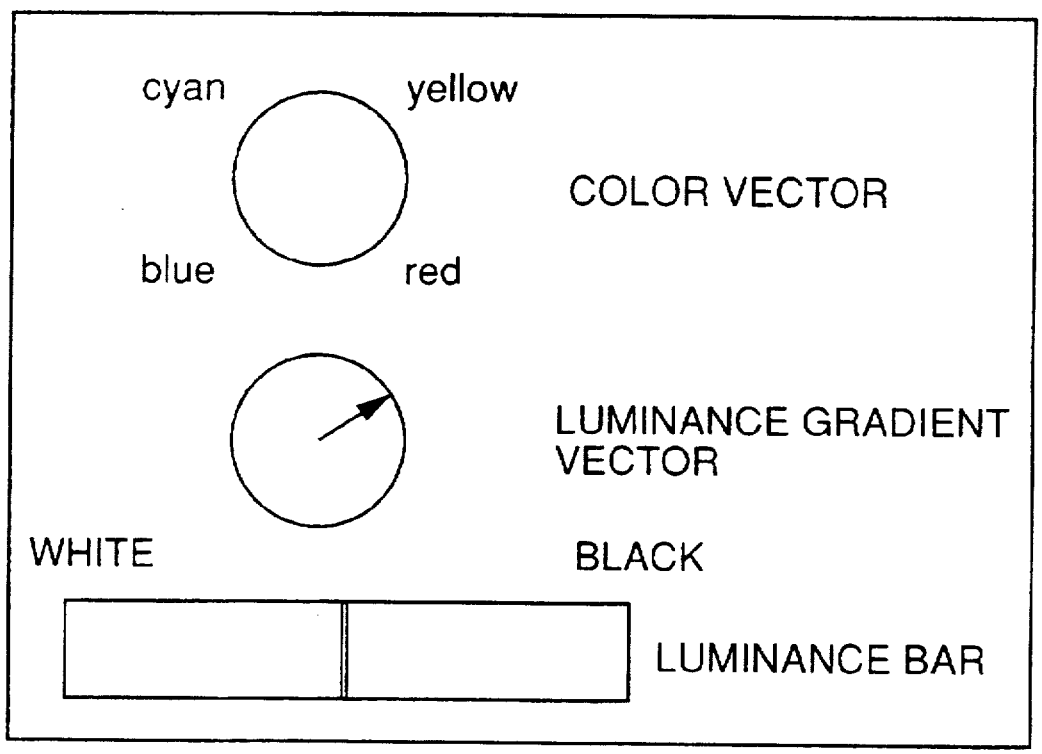
FIG. 7 is an illustrative drawing showing an example of a data window through which color, luminance, and luminance gradient are entered.
FIG. 8 is an illustrative drawing showing an example of a template.

In order to give more details of an object network, the object network for a picture drawing process shown in FIG. 1 will be used as an example. Upon a click by a mouse on "Colored point", a data window appears on a display as shown in FIG. 7. The data window includes fields for setting a luminance, a luminance gradient vector, and a color vector as set forth in a template of the network.

This is because certain AND constraints between attribute values of a noun object are provided for this object having the name "Colored point" and identified by a given value. These AND constraints in this case require a luminance value, a luminance gradient vector, and a color vector for this noun object to be complete. Assuming that a point indicating operation corresponding to the "identify" operation will be carried out with respect to a point of the "Point" items, the "Colored point" processing is initiated.

OR constraints indicate that "Point" can be indicated several times independently, and that attribute values can be indicated several times independently of the operation identifying "Point" as "Colored point" under the AND constraints. Rules on operations under these constraints coincide with the common sense which the user has, and require no operation input from the user, thereby providing a user-friendly object network for the system.

Hierarchy constraints work as follows. When a user operation comes to a point of "Colored region" in the object network, a template of "Colored region" forms a list of several parameters with respect to each horizontal scan line corresponding to a template of "Colored region segment" based on a defined template of "Colored line". As shown in FIG. 8, these parameters are coordinates (X, Y), a luminance value L, a luminance gradient vector (Lx, Ly), and a color vector (Cx, Cy) at a horizontal coordinate X on a horizontal scan line which is indicated by "Line".

If a lower-level object is added or eliminated by a further operation at this stage, the contents of the template shown in FIG. 8 are changed. The changes in the structure of the upper-level object are dependent on an X value of an object which is added or eliminated. In this manner, a matching operation is carried out across different levels in the hierarchy of noun objects. Rules of hierarchy constraints are used for this matching operation in the system.

The constraint rules described above are system constraints built in the system of the extensible-function language Extensible WELL in the present invention, and provide a user-friendly operation environment based on the constraints when operations are made on a given object network. In other words, names of the noun objects currently being processed on the object network serve as conditions for controlling the system. Changes in these conditions indicate relations with the constraint rules. Such a situation is shown in FIGS. 9A and 9B.

Figure 9A:
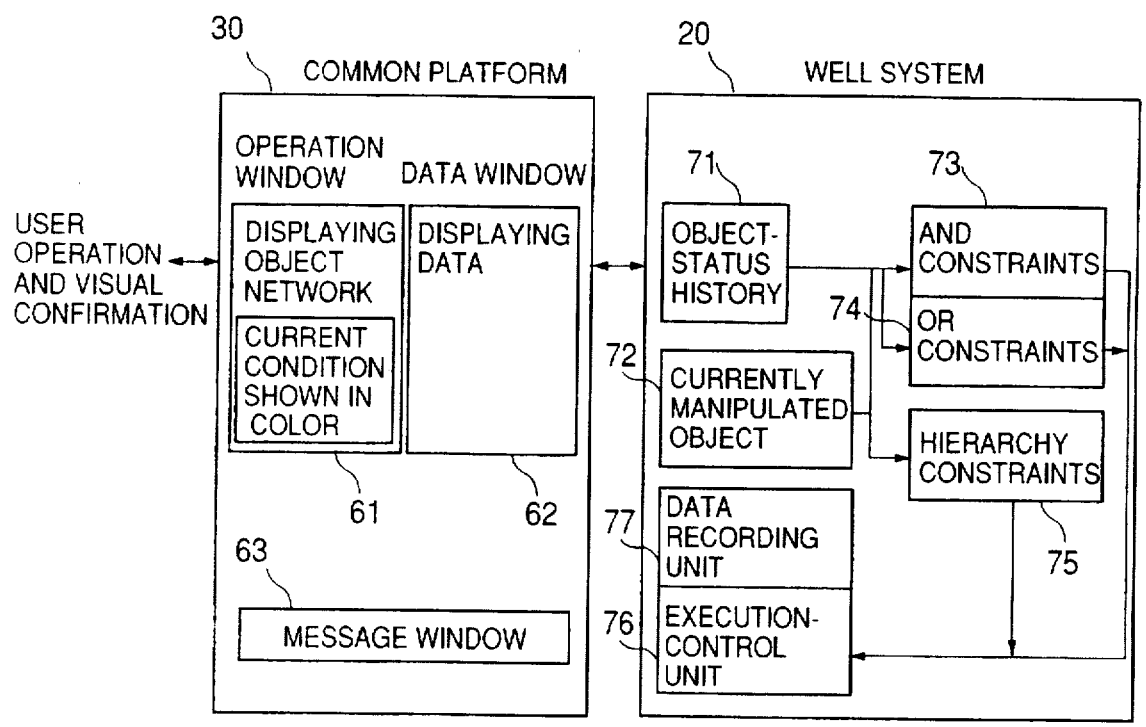
FIGS. 9A and 9B are illustrative drawings showing relations between system constraints and WELL.
Figure 9B:
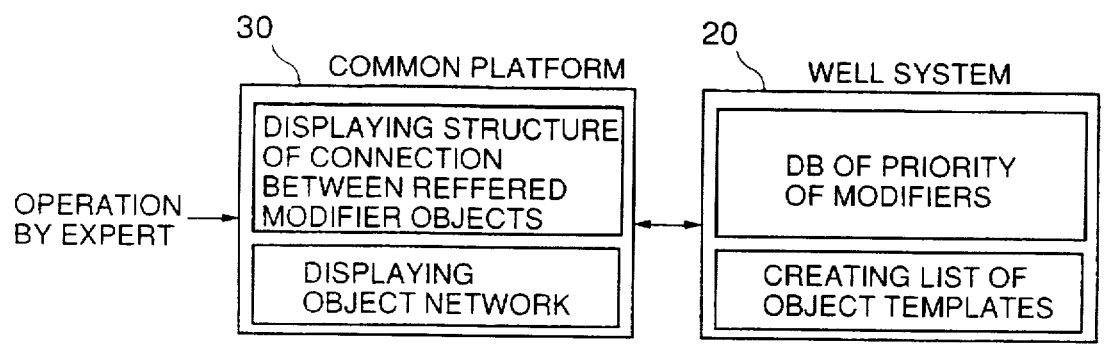

FIGS. 9A and 9B are illustrative drawings showing relations between the system constraints and the WELL. In particular, FIG. 9A shows a processing control based on the system constraints at the time of process execution, and FIG. 9B shows an example of an interactive control based on the constraints rules at the time of the object-network design.

As shown in FIG. 9A, a user makes an entry of instructions and data with respect to the WELL system 20 via the common platform 30. As the common platform 30, there are provided an operation window 61 for displaying an object network, a data window 62 for displaying data, and a message window 63 for displaying system messages. These windows display instructions and data intended by the user as well as results of the system execution.

The WELL system 20 checks an object-status history 71 and a currently manipulated object 72 by using an execution-control unit 76 in terms of AND constraints 73, OR constraints 74, and hierarchy constraints 75. The object-status history 71 records a history of object status, and the currently manipulated object 72 is an object which is currently manipulated. Based on the constraint checks, a process execution is controlled, and a data recording unit 77 records results of the execution.

At the time of the object-network design, as shown in FIG. 9B, the common platform 30 displays object networks and structures of connections between referenced modifiers (adjectives and adverbs), so that experts can employ constraints based on the models in the system. By using the WELL system 20, also, the experts can build databases regarding priority of the modifiers and tables of object templates based on the design of the constraints. In this manner, the experts can define a process model for a process execution.

Figure 10:
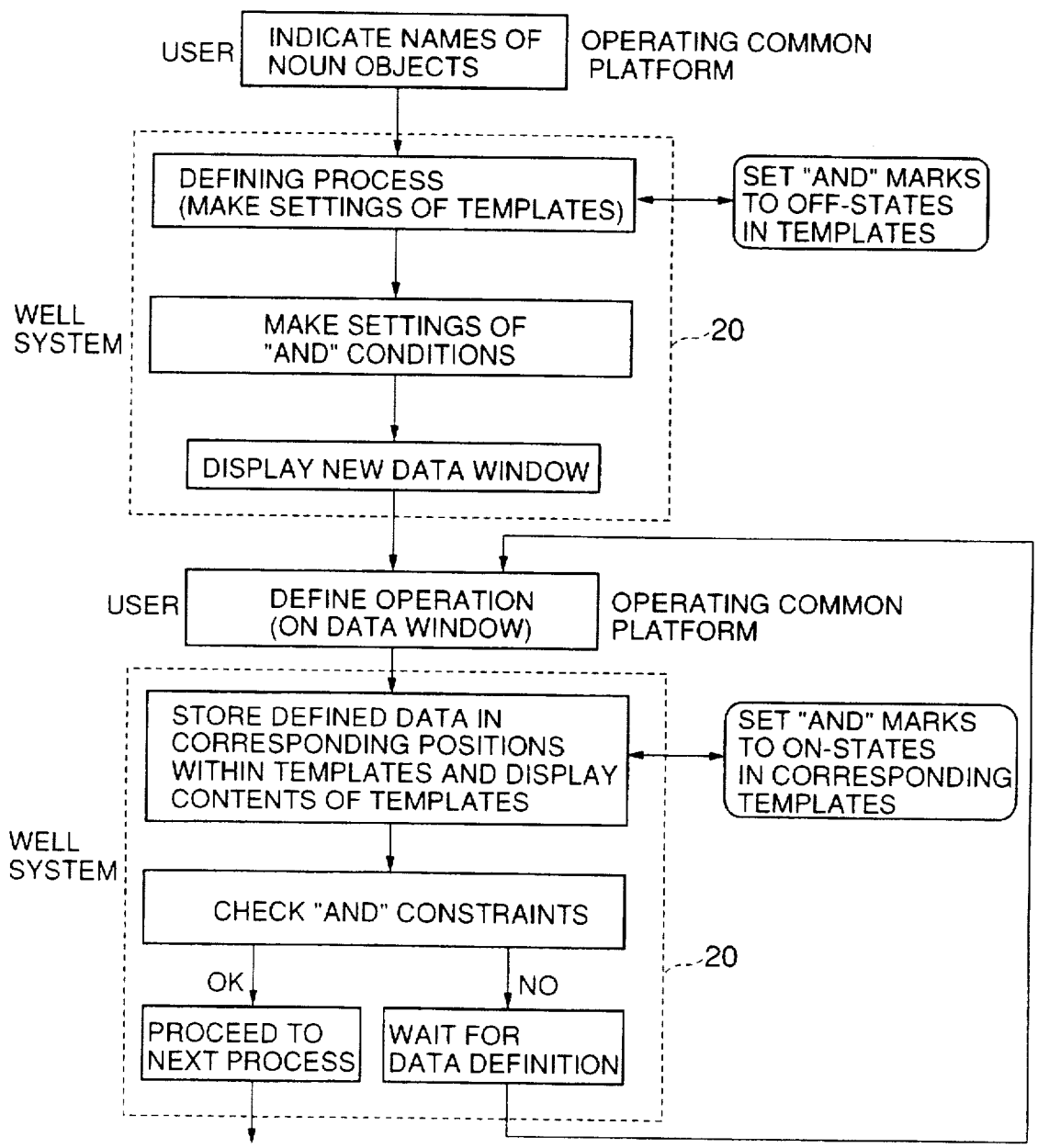
FIG. 10 is a flowchart showing a process flow with regard to a operation control system based on run-time system constraints (AND constraints)

FIG. 10 is a flowchart showing a process flow with regard to the operation control system based on the run-time system constraints (AND constraints).

The AND constraints allow a user to indicate a plurality of attribute values of noun objects through the following procedure.

(1) The user indicates names of noun objects by operating the common platform.

(2) The WELL system sets AND marks to off states in templates. This action is taken as a definition-preparation process. Then, the WELL system makes settings of the AND conditions, and displays a new data window.

(3) The user operates the data window on the common platform to define the attribute values.

(4) The WELL system stores the defined data in corresponding positions within templates, and displays the contents of the templates. Further, the WELL system sets the AND marks to on states in these templates.

(5) The AND constraints are checked, and a next process is carried out if all the necessary attribute values are present. Otherwise, data definition is waited for.

Figure 11:
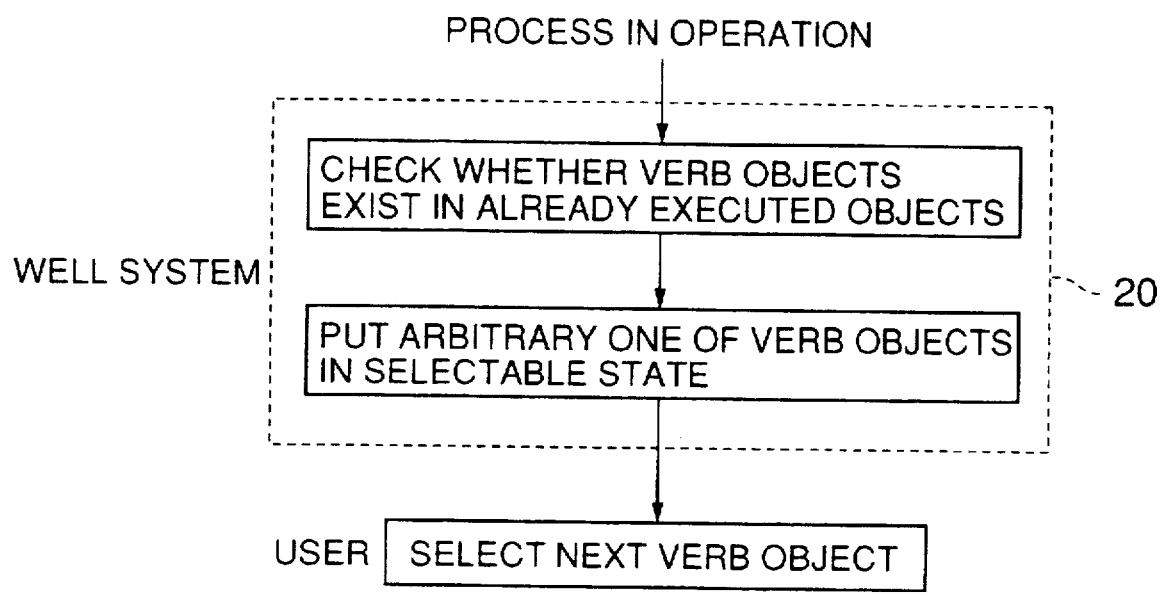
FIG. 11 is a flowchart showing a process flow with regard to the operation control system based on run-time system constraints (OR constraints)

FIG. 11 is a flowchart showing a process flow with regard to the operation control system based on the run-time system constraints (OR constraints). Under the OR constraints, a user can exercise the user's own discretion in choosing a verb object to apply.

(1) As process goes ahead, the WELL system checks whether a plurality of verb objects exist in already executed objects, and place an arbitrary one of the verb objects in a selectable state.

(2) A user selects a next verb object.

Figure 12:
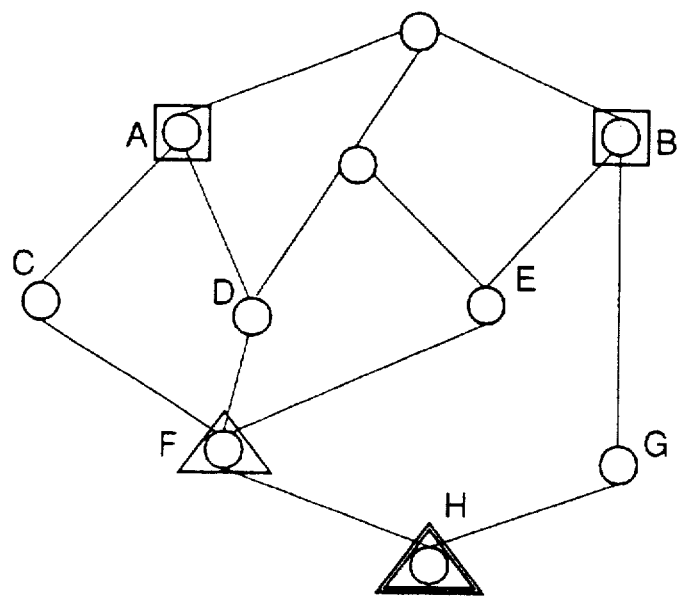
FIG. 12 is an illustrative drawing for explaining hierarchy constraints.

FIG. 12 is an illustrative drawing for explaining the hierarchy constraints.

During an execution of an object-network process, a need to carry out a matching operation may arise. This matching operation becomes necessary when a selection or deletion is made to a lower-level object by indicating the lower-level object while the executions of relevant upper-level objects are already finished. By redesigning attribute-value data of the already defined upper-level objects, such a matching operation can be achieved.

Assume that an object network has a hierarchical structure as shown in FIG. 12 so as to effect the hierarchy constraints, and that already defined objects A and B are locally highest-level objects as indicated by open squares with status of the objects A and B being currently displayed. Further assume that an object F indicated by an open triangle should be subjected to modification. Such a modification should be made while changing attribute values of the objects A and B as well as objects C, D, and E existing along intervening paths while sustaining already used template structures.

When an object H indicated by open double triangles is to be added or deleted, either an object name of this object is added, or a particular indicated object is deleted. In such a case, the objects should be prepared to change the contents of the templates existing along intervening paths toward the upper-level objects A and B. This is necessary for the matching operation.

To this end, the execution control unit of the WELL system is provided with a locally-highest-level-status storage unit and a current status storage unit with regard to an object network being currently processed. The locally-highest-level-status storage unit stores names of the locally highest-level objects which are already executed, and the current status storage unit stores names of the object being currently processed.

Figure 13:
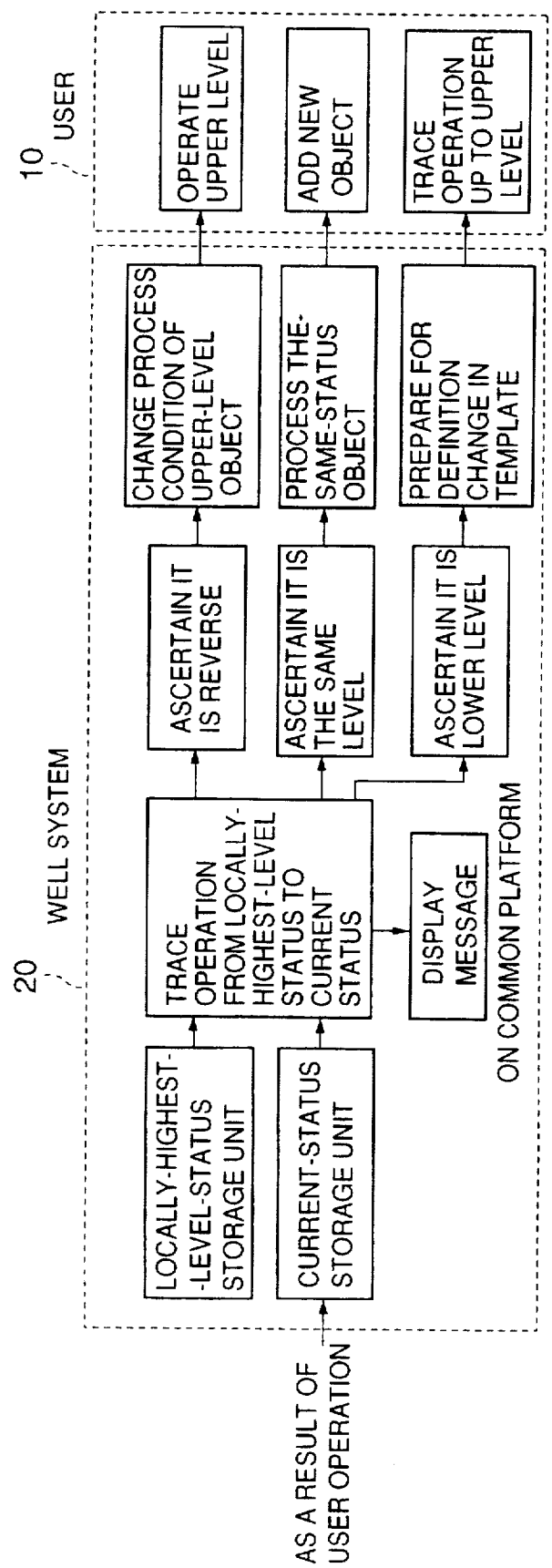
FIG. 13 is an illustrative drawing showing a flow of hierarchy constraint processing.

FIG. 13 is an illustrative drawing showing a flow of the hierarchy constraint processing.

Trace operations at higher levels in FIG. 13 mean that preparations and operations of definitions should be made in order to set the template contents with respect to each object for the purpose of the matching operation. Because of this, messages are displayed on the common platform when settings are unfinished with regard to the object network.

In the following, a part of speech with regard to objects of the present invention will be described.

In the extensible function language Extensible WELL, all services are expressed in a predicate format such as "user selects a point", and these services are carried out for different purposes depending on types of parts of speech of the objects. Because of this, parameters are attached to the templates to identify a part of speech for each object. These parameters make it possible to determine whether a given object indicates a status of a service, an operation, or constraints.

Since types of services are expressed in a predicate format, a structure of connections between objects determines the content of the services. Such structure includes an object of a verb (verb+noun), an adverb for a verb (verb+adverb), a noun for an adjective (adjective+noun), etc. Objects connectable to a given object have respective priority. In order to determine this priority, a table of priority is looked up when connecting objects having respective priority.

Figure 14:
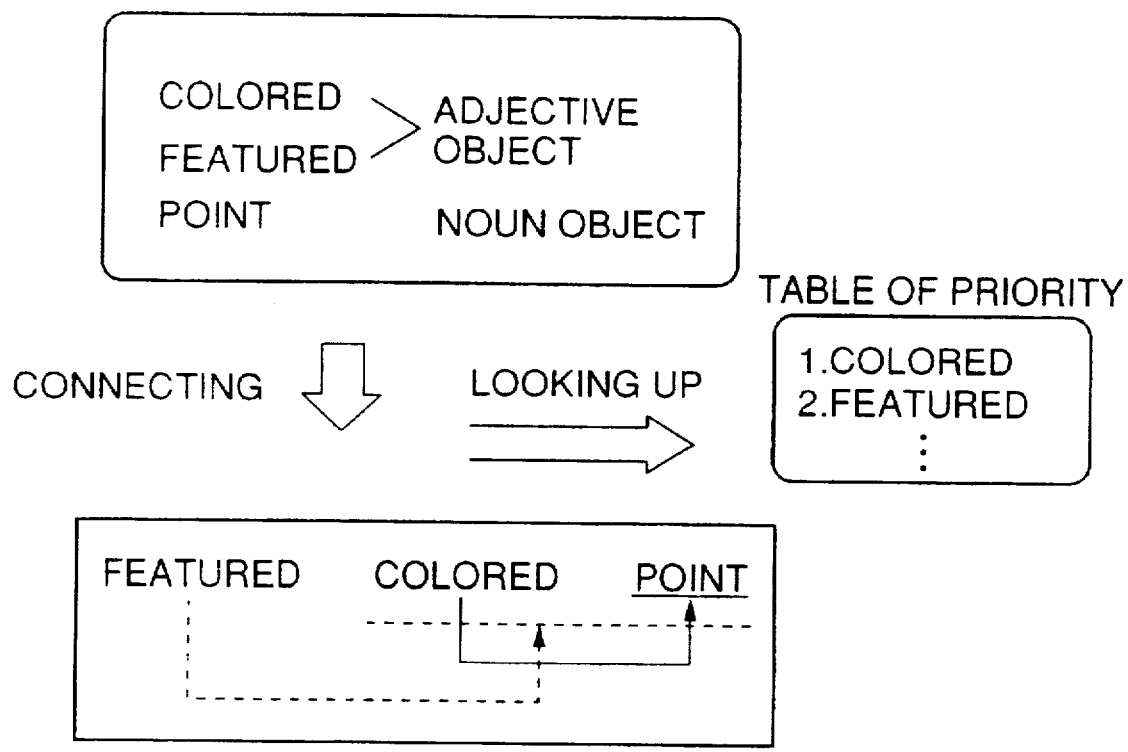
FIG. 14 is an illustrative drawing showing an order of object connections.

FIG. 14 is an illustrative drawing showing an order of object connections.

In an example of FIG. 14, two adjective objects "colored" and "featured" modify a noun object "point". By looking up the table of priority, the object "colored" is first connected to the object "point", and, then, the object "featured" is attached to the combined object "colored point".

According to the hierarchy constraints, the contents of lower levels are given priority over the contents of upper levels. This means that modification made to an object network at a certain level will affect the contents of the upper levels. The matching operation is driven by objects existing at lower levels rather than objects residing at upper levels in the object network.

In what follows, a template and a data schema of each object will be described.

The extensible function language Extensible WELL uses four types of parts of speech, including a noun, a verb, an adjective, and an adverb. Templates for these parts of speech will be described below. The contents of these templates are usually decided by the experts who design objects.

Noun Object

Elements necessary for creating a template of a noun object includes a noun-object name, a parameter indicating a type of a part of speech, a constraint pointer indicating temporal constraints, and a template of the object. Also, a table of priority is provided in order to define priorities of adjective objects which are connectable to this noun object. An order of an adjective arrangement will be decided based on this table of priority.

Verb Object

A verb object includes a verb-object name, a parameter indicating a type of a part of speech, input data to this verb object (a noun to be processed), output data from this verb object (a noun resulting from the processing), a text stating the use of this verb object (this use is shown to a user via the message window), and constraint pointers pointing at temporal constraints and modal constraints.

Figure 15:
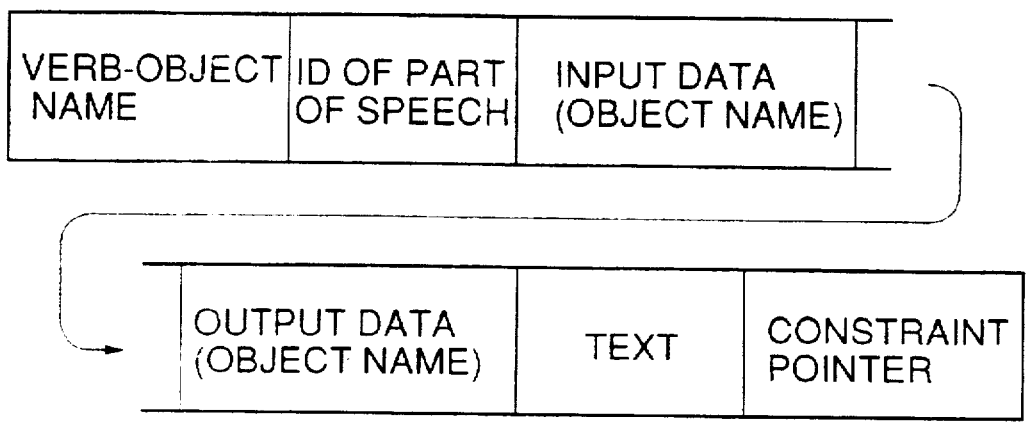
FIG. 15 is an example of a template and a data schema of a verb object.

FIG. 15 is an example of a template and a data schema of a verb object.

In the template of FIG. 15, a verb-object name is a name of this verb object. An ID of a part of speech is a parameter representing a type of a part of speech with regard to this verb object. This ID takes a value of "0" to indicate a noun, "1" to indicate a verb, "2" to indicate an adjective, or "3" to indicate an adverb, for example. Input data gives a name of an object provided as input data, and output data indicates a name of an object obtained as output data. A text is a description of use of this verb object, and a constraint pointer points to constraints.

Generic verb objects may have the same name but different uses. In this case, generic verb objects are changed into status objects and further to definite objects based on the system conditions (a product representation between the input data and the output data, or constraints posed by adverbs or the like) so as to determine the content of the service. This is determined by the process development layers, and is controlled by the operation control system.

Adjective Object

An adjective object includes a name of the adjective object, a parameter indicating a type of a part of speech, a pointer pointing to constraints, and a template containing the contents. An order of an adjective arrangement when connected to a noun object is decided by making reference to a corresponding table of priority.

Adverb Object

An adverb object includes a name of the adverb object, a parameter indicating a type of a part of speech, and a pointer pointing to constraints. An order of an adverb arrangement when connected to a verb object is checked by looking up a corresponding table of priority.

In the above, the system constraints which are built in the WELL have been described. In addition to these system constraints, service constraints are provided with regard to services requested by a user.

In the following, a service division will be described.

In order to provide useful agent functions, complex services should be divided into smaller and detailed services. Such a division mainly includes two types of divisions, i.e., a layer division and a parallel division.

The layer division is represented by a nest format, and has three states including "pre-state", "in-state", and "post-state". In the pre-state, required pre-processes are carried out. In the in-state, actual services are rendered with respect to a next layer. In the post-state, a check is made as to whether results of the rendered services are appropriate.

The parallel division is conducted when services are mutually exclusive. Divided services can be carried out in parallel.

There are several constraint classifications, and these classifications are as follows.

Divided services are controlled by using constraints. Temporal constraints are used for the layer division, and modal constraints are used for the parallel division.

In the temporal constraints, required conditions are treated as the AND constraints. Namely, a process can not shift to a next state unless all the required conditions are met. In the object network shown in FIG. 1, a service for drawing a point on a display is taken as an example. This service is expressed by "draw up Point" in the extensible function language Extensible Well. The verb object "draw up" is accompanied by the noun object "Point" serving as an object word. Coordinate data of the point in the example of "draw up Point" is the temporal constraints for this operation. The OR constraints (independency) are applied to processes having mutual independency so as to achieve parallel executions of these processes.

The modal constraints are used when the service results independently obtained after the parallel division are integrated with each other. When pictures independently drawn are combined, for example, relative sizes, directions, and angles between these pictures are examples of the modal constraints. In addition, constraints regarding processes are included in the modal constraints. These constraints are the hierarchy constraints.

As previously described, an operation to a lower-level object results in a need to carry out the matching operation for upper-level objects. Further, there are priority constraints which deal with priorities of the role functions. These are used for determining the priority of the roles in the process.

Constraint processing is carried out as follows.

In carrying out the constraint processing using the constraint conditions described above, the defining process and the define operation previously described are enhanced to be used for control purposes. Basic ideas of the defining process and the define operation, i.e., preparation of templates in the defining process and storage of data in the templates in the define operation, are kept unchanged. In order to carry out the constraint processing, however, the templates should be able to change in a dynamic manner. This necessitates control of template sets and a template list. It is the constraint conditions which determine templates subjected to dynamic changes.

Figure 16:
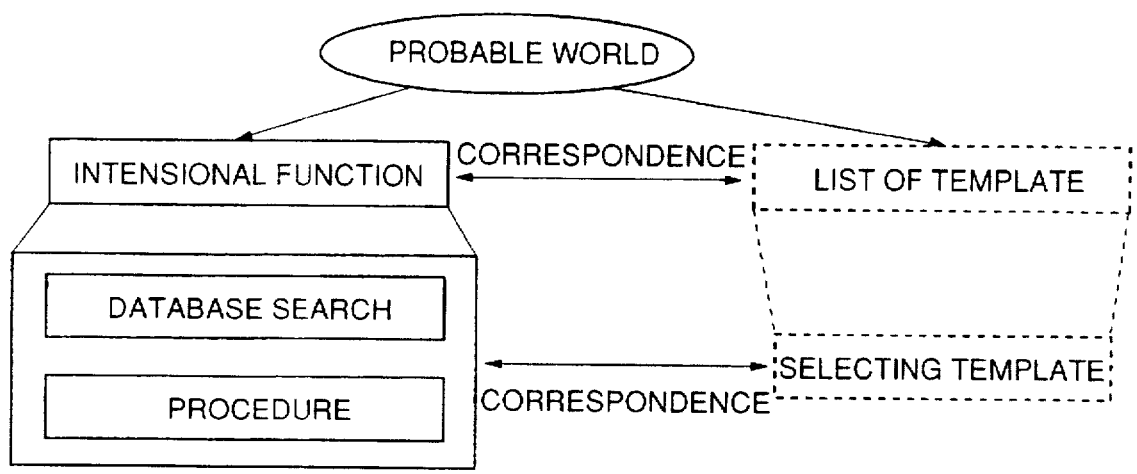
FIG. 16 is an illustrative drawing for explaining constraint processing and an intensional logic.

FIG. 16 is an illustrative drawing for explaining the constraint processing and an intensional logic.

In the extensible function language Extensible WELL, data needs to be defined in an object-oriented manner, and values of the data need to be already defined. On the other hand, constraints are treated in a name-oriented manner, and there is no need to define values of the constraints. Only a reference by a name is possible with respect to the constraints. As shown in FIG. 16, an intensional function turns into an extensional representation when provided with a probable world, and becomes equivalent to data when values are defined. The dynamic changes in the templates as described above become necessary for this intensional function.

A methodology for controlling both the data and the constraints in a unified manner is provided by means of intensional logic representations. The data is represented by $\alpha(\beta)$, and the constraints are represented by $\alpha\{\beta\}$. This $\alpha\{\beta\}$ is denoted as a set of $P\{j\}$ which represent characteristics of $\alpha$ by predicates.

An object $\beta$ has an attribute $\alpha$. The parentheses { } means providing a probable world to generate the object P which satisfies the attribute $\alpha$. This generation is the constraint processing, and includes two types of generation methods. These are a database search and a procedure.

An example of the database search is an extraction of "Highlight Point". This extracts a point having the greatest highlight value or points having a highlight value greater than a level indicated by an expert from points arranged along an indicated horizontal scan line. "Highlight Point" in this case can be regarded as an adjective because it modifies the noun "Point", and is used as a determiner to indicate a particular "Point".

An example of the procedure may be to arrange points symmetrically with respect to a given object. Objects "Point" in this case have an attribute indicating symmetry with respect to the given object, and the agent-role server calls a procedure necessary for generating "Points" which satisfy the symmetry conditions. The agent-role server knows an agent with the highest priority for this particular task, and makes a request to this agent. This agent with the highest priority may be a user or a server machine, but these two are regarded as being equivalent to each other, except that required interfaces are different. That is, a user in this case is treated as one of the servers.

Values obtained in this manner are stored in the template by the define operation.

The service constraints are represented as relations between attribute values within an object or as relations between attribute values across a plurality of objects. For example, a symmetry of two lines requires the two lines to be mirror images of each other with respect to a center line. In this case, constraints of the symmetry are either extracted from the constraint database in the system or defined by a user using attribute values of objects as constraint conditions. In the latter case, a request is made to a server which can satisfy the required conditions. In the case of data, a user is one of the servers as mentioned above. Likewise, the defining process and the define operation are requested to a server in the case of the constraints.

Details of the service constraints are the same as those shown in FIGS. 14 through 16 in the Japanese Patent Laid-open Application No. 7-295929. Also, WELL system support and constraint processing which are shown as a parallel execution mechanism for achieving objectives in this reference are relevant. This mechanism is provided as one of the common-platform functions by the agent function.

As described above, the data model, the object model, and the process model have hierarchy structures, and a combination between these models allows the user's intention to be transformed into executions in the computer. A process of this transformation is an execution model for achieving objectives, and is represented as a process model in effect. The user's intention in this process model is realized by the WELL system by operating the object network shown on the common platform.

Because of this, the process model has an execution process controlled by the common platform between the agent-role server and the user, the agent-role server making requests for services to the specific-role servers with execution results being returned to the agent-role server as a response.

Figure 17:
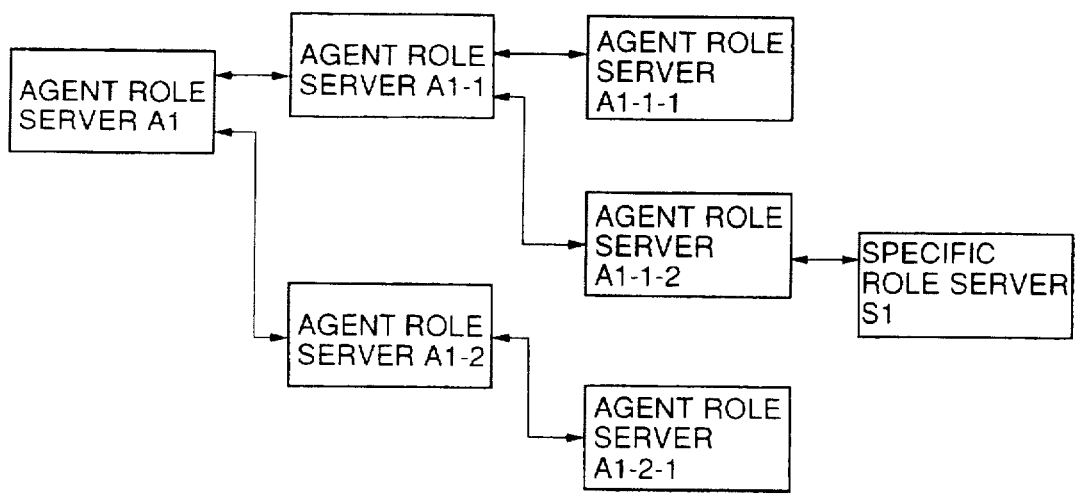
FIG. 17 is an illustrative drawing showing an example of agent-role servers organized in hierarchy.

This configuration can take a form shown in FIG. 17. As shown in FIG. 17, agent-role servers are arranged in a hierarchy with upper-level agent-role servers treating lower-level agent-role servers as specific-role servers.

An interaction process between these servers is effected based on ideas disclosed in the Japanese Patent Laid-open Application No. 7-295929 while achieving requirements of (a) visualization, (b) interaction, and (c) cooperation.

In establishing connections between the models, templates based on attribute-value structures become necessary as models of data when noun objects are indicated during operation of objects of the object network shown on the common platform. To this end, the following procedure is carried out.

(a) A template created by the defining process is loaded into a work memory area of the WELL system, and a data window is opened.

(b) A user works on the data window opened on the common platform to define data values. This step is the define operation.

When constraints exist as characteristics between attribute values of noun objects, satisfying these constraints involves an activation of a process for obtaining undefined attribute values as well as defined attribute values. The agent-role server which is in operation gives a set of attribute values as parameters and characteristics defining the constraints to a specific-role server in charge of a role of obtaining solutions which satisfy the constraints, with a request made to obtain the solutions. Working on the parameters provided from the agent-role server, the specific-role server returns the solutions regarding the constraints.

In what is described above, (a) the data can be regarded as communication between the user and the agent-role server, and (b) the constraints can be considered as communication between the agent-role server and the specific-role server. In the WELL system, the user is one of the specific-role servers, and the user gives solutions to fulfill the user's intention. In this manner, the WELL system can proceed with a process by using the same process model for both the data and the constraints.

An example of image modification based on continuity constraints will be described below. Continuity of an image is ensured and constraint driving is carried out as follows.

Image Continuity

When object shapes in an image are to be changed, relevant portions of the image are defined as areas, and shift vectors are assigned to main points forming these areas. By doing so, interiors of the areas can be subjected to continuous transformation, but surrounding areas will suffer large changes in features due to the transformation. For example, some areas may be shifted such that a continuity between the shifted areas and non-shifted areas is lost, with an apparent discontinuity created to reveal the shift of areas. In such a case, conditions for the area transformation may be met, but the image continuity fails to be satisfactory, arousing an artificial visual sensation.

Figure 18:
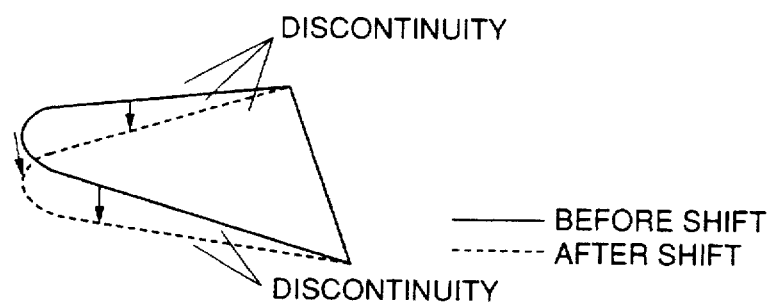
FIG. 18 is an illustrative drawing showing an example in which discontinuity is created in an image due to an area shift.

FIG. 18 is an illustrative drawing showing an example in which a discontinuity is created in an image due to an area shift. A solid curve shows an area before a shift, and a dashed curve represents an area after the shift, with this shift creating the discontinuity. In order to ensure continuity in such an image as this, the system should take care of discontinuity prevention. For this purpose, the constraint driving as described below is employed.

Constraint Driving

The constraint driving is a driving method using substitute data obtained from constraints when there is missing data.

When some areas are shifted in a large magnitude, for example, continuity with the surrounding regions will be lost. The system of the present invention does not expect users to indicate areas to be corrected after the loss of the continuity, but designates areas likely to require correction in advance, and attends to corrections of these areas. If results of the corrections are satisfactory to the user, the system goes ahead with a next process. These results, however, are not always acceptable. The system in such a case attends to further corrections, or asks the user to indicate areas requiring corrections. Since a plurality of processing methods are provided in this manner, a continuation of a procedure is secured by switching between processing methods even when a given processing method fails to be effective.

The formal models of the object models represent a template structure of a data model as an attribute-value structure. This is expressed as data in some cases and as constraints in other cases.

The feature models of the object models include geometry features such as structure lines, which are commonly observed constraints. When branching structures of the structure lines are represented by relations between image areas, they also relates to sense models. In this case, it is generally a user's instructions and operations which control the system through basic operations such as the use of the data models.

What is described above means that the constraints have hierarchy structures. When the continuity constraints previously described are provided with respect to relations between controlled areas, for example, transformation of the controlled areas is necessary. To achieve the transformation, however, a hierarchy structure for defining areas is necessary to provide feature points which define the controlled areas.

Figure 19:
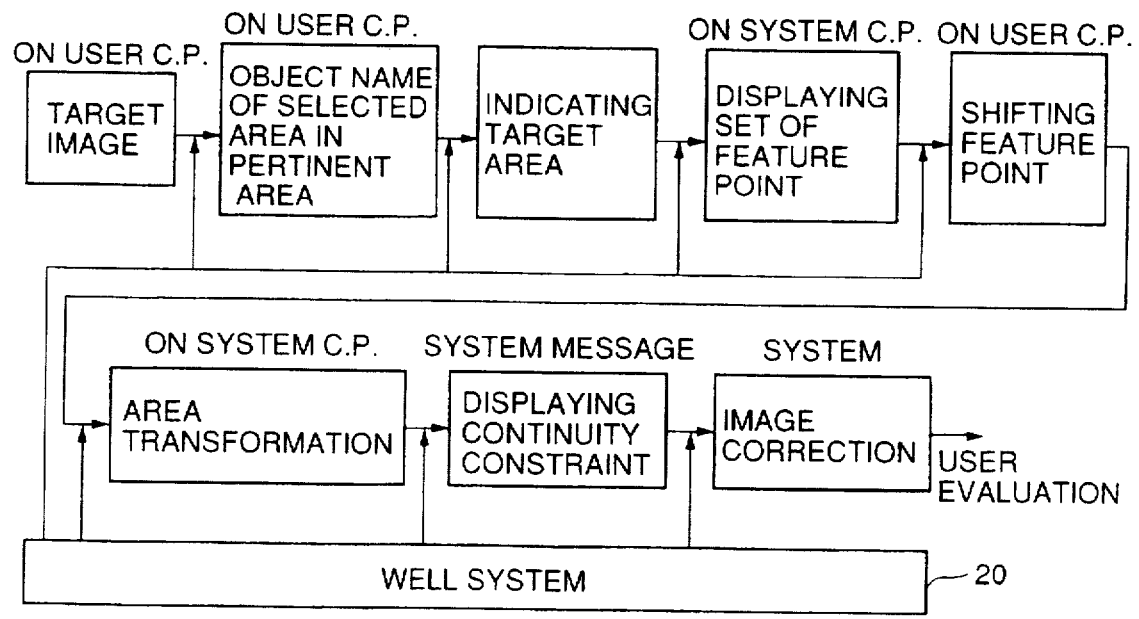
FIG. 19 is an illustrative drawing showing an example of hierarchy constraint processing of an image.

FIG. 19 is an illustrative drawing showing an example of hierarchy constraint processing of an image.

The processing shown in FIG. 19 obtains new areas by changing feature points with respect to "Points" on the "Regions" within an element network of the object network, which is shown in FIG. 1. If attribute values are set by using original values, however, the continuity will suffer some damage. Thus, a corrective measure is taken to eliminate this discontinuity.

When execution processing is carried out across a plurality of layers, the WELL system performs the constraint processing as the system constraint, activating a new process for correcting the image.

What is describe above means that the system hierarchy matches with the model hierarchy, and that the models define a method of transforming abstract objects into concrete objects. The same applies in the inverse transformation.

The agent-role server engages in a dialog (interaction) with regard to a user's intention by using objects having some abstractness. Providing definite parameters via the agent-role servers, the specific-role servers as a whole system conduct indirect communications. As for the content of the processing, it is provided as specific requirements for the user.

Figure 20:
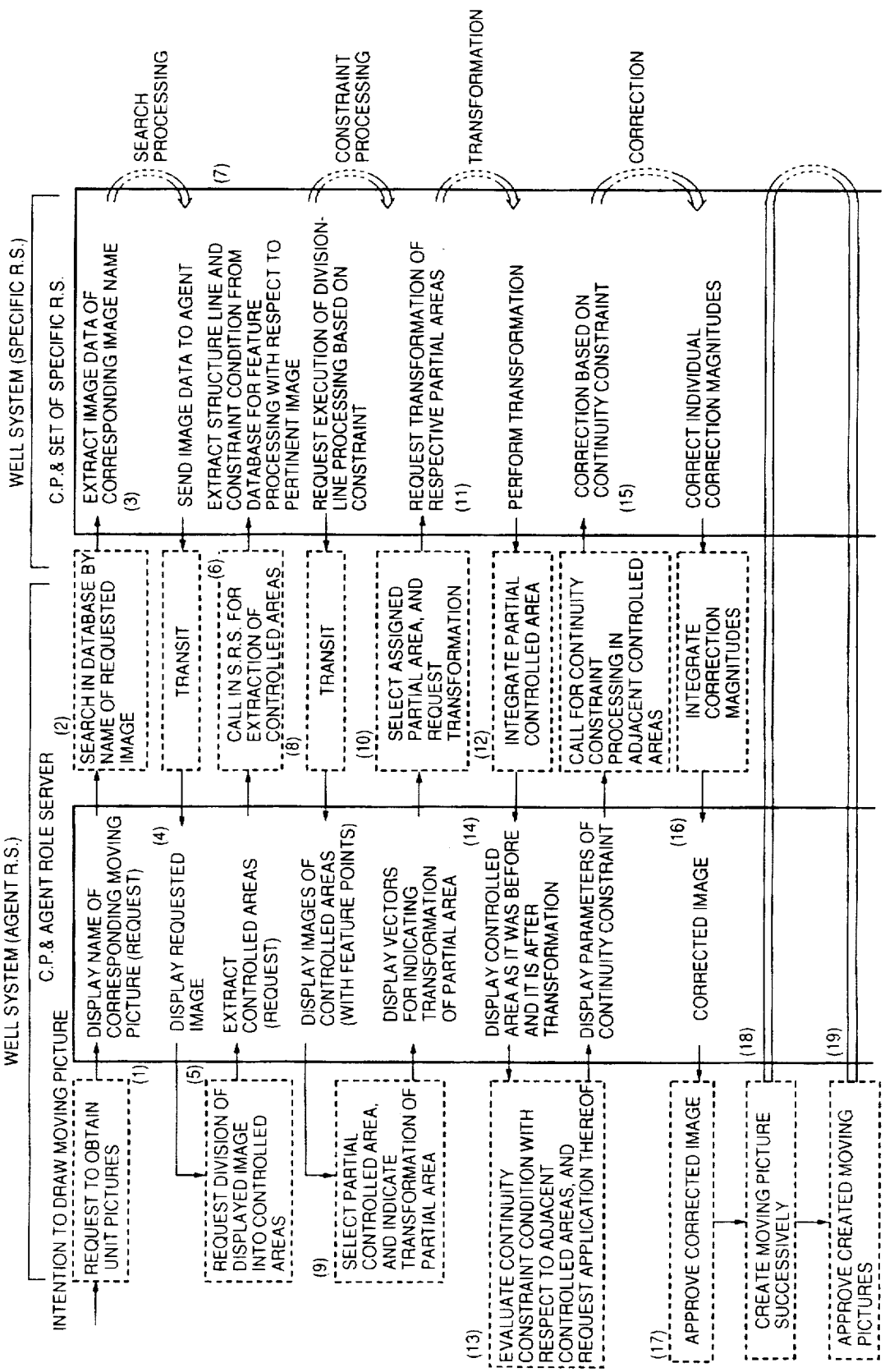
FIG. 20 in an illustrative drawing showing a flow of interaction process with regard to continuity constraints, which are a type of service constraint in a moving-picture drawing system.

FIG. 20 is an illustrative drawing showing a flow of interaction process with regard to continuity constraints, which are one type of service constraint in a moving-picture drawing system.

(1) With an intention to draw a moving picture, a user requests still pictures via the common platform as each of the still pictures forms a unit of the moving picture.

(2) The agent-role server calls in the specific-role server to request a search in the database by names of requested images, and the specific-role server makes a search to extract the image data of the requested names.

(3) The specific-role server gathers the image data of the requested names, and sends them to the agent-role server.

(4) The agent-role server serves as a transit, and displays requested unit images via the common platform.

(5) The user requests divisions of a displayed image into controlled areas along concave-and-convex separating lines, for example.

(6) The agent-role server receives the request for the extraction of the controlled areas via the common platform, and calls in a specific-role server.

(7) The specific-role server extracts structure lines and constraint conditions from the database for feature processing with respect to the pertinent image, and asks for the execution of division-line processing based on the constraints.

(8) The agent-role server works as a transit, and displays data of the controlled areas with the feature points superimposed on the pertinent image via the common platform.

(9) The user indicates a set of feature points to select a controlled area, and indicates a shift amount to transform the selected controlled area. Upon these operations, instructions are sent to the agent-role server with help of the vector display or the like for indicating a method of the transformation on the common platform.

(10) The agent-role server requests a specific-role server to transform the selected controlled area.

(11) The specific-role servers each carry out the transformation processing upon a request for the transformation of a respective controlled area. In detail, a shift of each pixel within the respective controlled area is made based on motion vectors indicated in the method of transformation.

(12) The agent-role server displays adjacent controlled areas before and after the transformation via the common platform, for the purpose of integrating the controlled areas.

(13) The user asks for an evaluation of continuity constraint conditions with respect to adjacent controlled areas, and requests an action to be taken based on the evaluation with an entry of necessary parameters.

(14) The common platform transfers the parameters of the continuity constraints to the agent-role server, and the agent-role server calls in a specific-role server for conducting the continuity constraint processing in the adjacent controlled areas.

(15) The specific-role server attends to the correction based on the continuity constraints in the adjacent controlled areas, and calculates the magnitude of the correction for each of the respective controlled areas to send it to the agent-role server.

(16) The agent-role server integrates the magnitude of the correction, and displays the corrected image on the common platform.

(17) The user checks the transformed image as to whether it is acceptable. If it is acceptable, the user approves it. If not, the user requests further processing.

(18) By repeating the above steps, moving pictures are successively created.

(19) If all the moving pictures are approved, the procedure ends.

In the following, a method of controlling interaction operations in the system of the extensible function language Extensible WELL will be described. It should be noted that the following description may have some repetitions from previously provided descriptions in terms of their contents.

Implementation of the present system requires an interface system serving as an interface in order to render various types of services and to carry out cooperative operations between the user, the system, and service processes in an effective and smooth manner. Namely, there is a need for a system for monitoring, displaying, and controlling operation status of the processing system. Hereinafter, this system is referred to as an interactive operation control system, and a description thereof will be given below.

Objectives of rendering services by the interactive operation control system are as follows.

Figure 21:
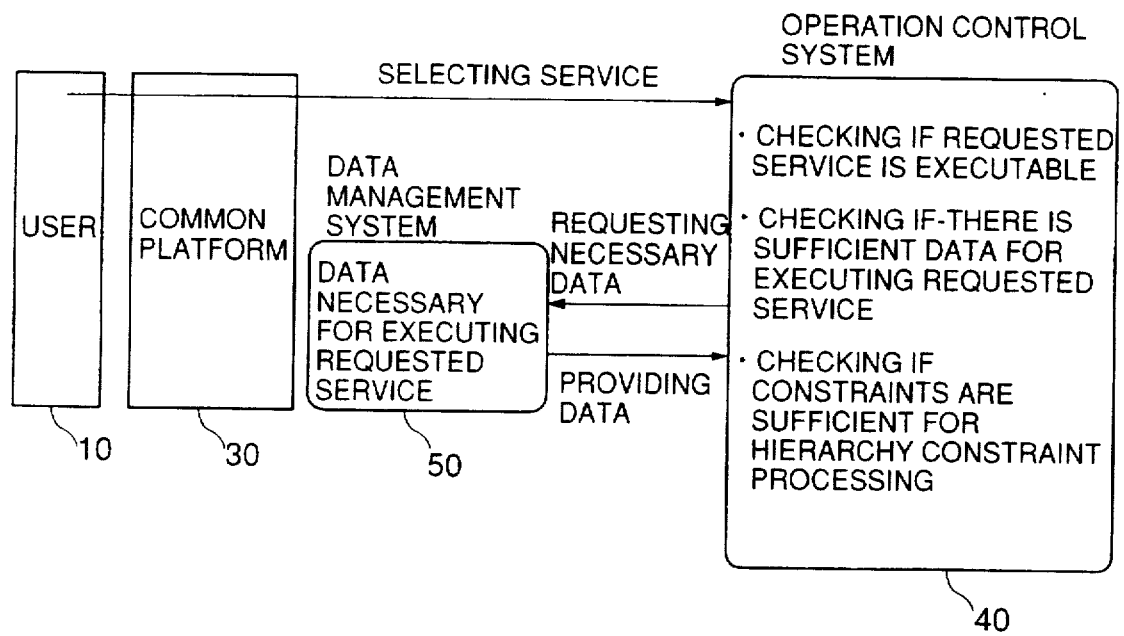
FIG. 21 is an illustrative drawing showing a control flow of the operation control system when a user requires services.
Figure 22:
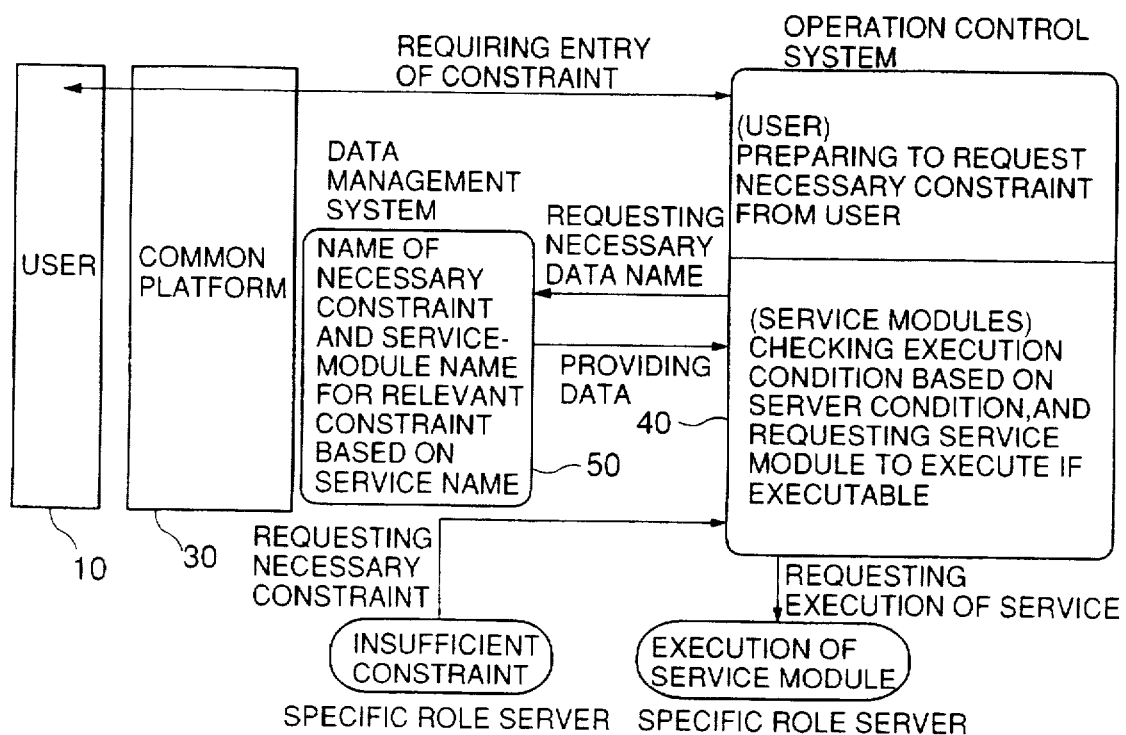
FIG. 22 is an illustrative drawing showing a control flow of the operation control system when a plurality of specific-role servers carry out cooperation processing.

The WELL system in the present invention is intended to enhance system performance through interactive cooperation processes, and the interactive operation control system necessary to this end has two main objectives of rendering services. One is to offer services when the user requires them, and the other is to provide services when a plurality of specific-role servers carry out the cooperation processing. FIG. 21 is an illustrative drawing showing a control flow of the operation control system when the user requires services. FIG. 22 is an illustrative drawing showing a control flow of the operation control system when the plurality of specific-role servers carry out the cooperation processing.

Operation control in either case is achieved by effecting the modal constraints and the temporal constraints. The modal constraints place constraints on the contents of tasks through interactions with the user, and the temporal constraints check the completion of the tasks, for example.

First, the operation control when the user requires services will be described.

In order to proceed with the tasks in a prompt and appropriate manner when the user requires services, operations by the user should be guided to a correct end. For example, if the user mistakenly makes a request to move pictures before drawing up still pictures during the moving-picture creation process, the user does not know where to send the request since there are no still pictures to move. In order to avoid such a situation, making of requests should be limited such that requests can be made only if requested services can be carried out without failure.

The operation control system of the present invention prepares for processes of the tasks by using the generic data management system and the process construction layers based on the services requested by the user. Since the operation control system is structured to keep track of the status of ongoing processes, it can issue permissions of executions only to those processes which are executable. This is achieved by the part of the operation control system which deals with the modal constraint processing. Keeping track of the status of ongoing processes is effected by using flags.

Operation control at the time of service preparation checks is carried out as follows.

Controls needed when the user requests services include a check as to whether the system is ready to carry out the requested services. The WELL system of the present invention renders services based on the object network, which is defined as process modalities in a graph structure representing states as noun objects (nodes) and state-transition functions as verb objects (branches) with regard to a process of each field.

At the time of providing a service, there are cases in which the service cannot be offered, including a case in which the object network is not yet activated so that a task cannot be carried out, and a case in which a branch is not yet processed so that the processing of a next node cannot be attended to. To cope with these cases, the operation control process checks and controls these cases. For example, a check on preparation is easily made by putting up a flag when a preparation is completed. This is achieved by the part of the operation control system which deals with the temporal constraint processing that is part of the constraint processing.

Operation control at the time when some data is missing for rendering a service is carried out as follows.

There is a need to make a check as to whether constraints are sufficient in order to render a requested service. When a service is required to make two objects collide with each other in a moving picture, for example, constraint conditions become necessary with regard to a size and motion data of each object after extracting the two objects. Without these constraint conditions, the process of colliding of the two objects cannot be carried out. When informed of lack of constraints in an event driven manner, the user should make a request to a service module (a set of functions to carry out a process in each application field). It should be apparent that the operation control system is not called in when all the necessary data is present.

In general, a check of constraint conditions is made such that a verb object asks the data management system for the constraint conditions which are required for rendering a service.

Operation control with regard to the hierarchy constraints is carried out as follows.

The hierarchy constraint processing needs to be carried out to correct upper-level objects in response to modifications made to lower-level objects based on relations between the upper-level objects and the lower-level objects, and such a processing is based on service processes represented in the object network of the image drawing system using the extensible function language Extensible Well. When encountering that data (constraints) is missing at the time of the upper-level-object correction, the operation control system recognizes that the data is missing, and requests necessary data through interactions with the user or the service module.

Figure 23:
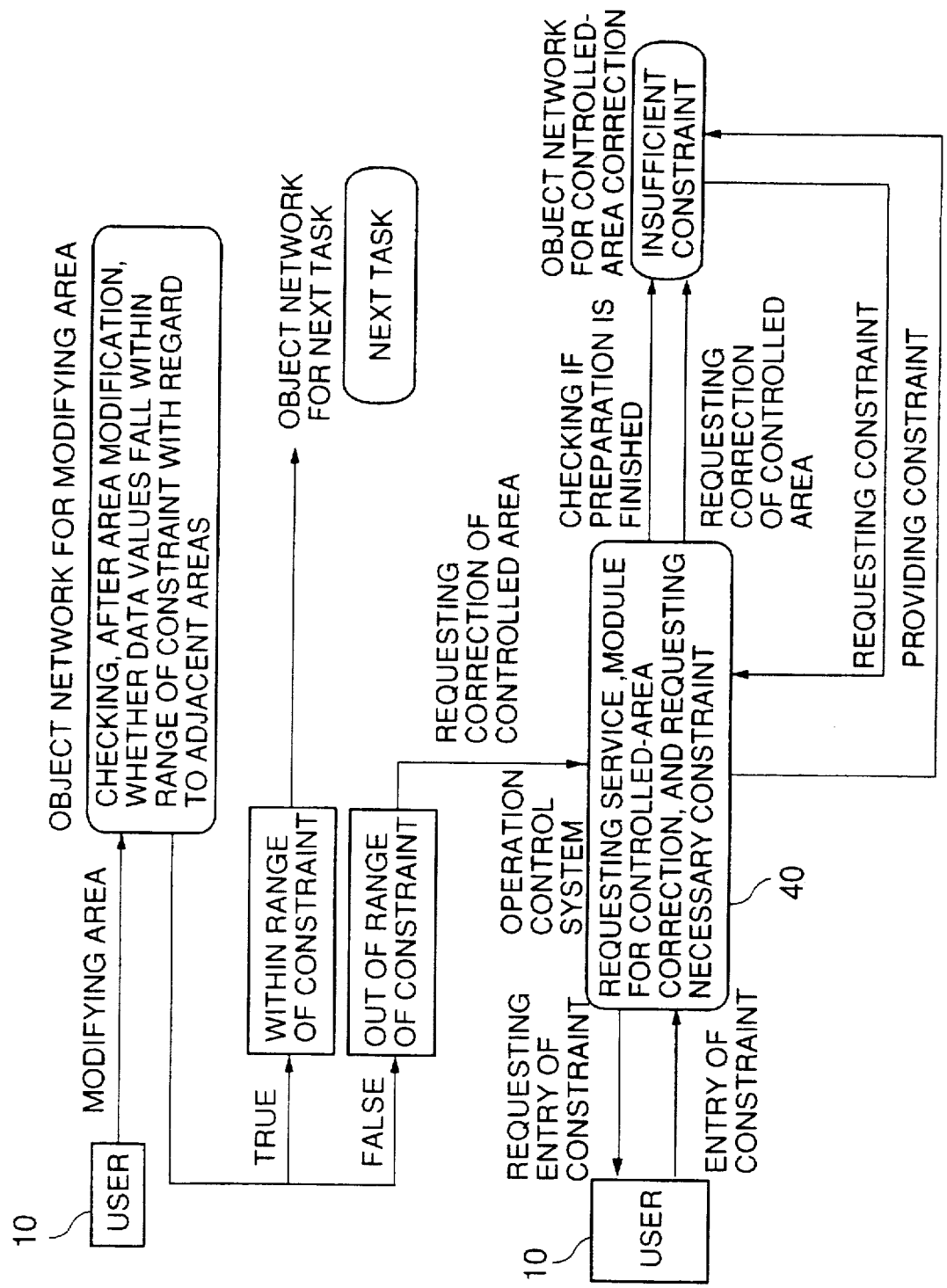
FIG. 23 is an illustrative drawing showing an example of control by the operation control system.

FIG. 23 is an illustrative drawing showing an example of the control by the operation control system. The control by the operation control system described above will be explained with reference to the example of FIG. 23.

This example is of corrections of discontinuity in an image by using an object network when such a discontinuity is created due to transformation of an image such as a picture of a human face. In this example, a user creates constraints in response to a request for the constraints necessary for the task. As has been described with reference to FIG. 21, the operation control system first carries out the operation control for limiting available services based on the current conditions, and, then, offers a service for changing expressions of the human face.

A pertinent object network is used for transforming some areas of the human face image, and, by looking into relations with adjacent areas, checks whether the transformation falls within a predetermined range for ensuring continuity in the image. If the transformation is within the predetermined range such as in the case of relatively small shift amounts, a next task goes ahead. If the transformation is out of the range, however, image discontinuity is created, so that corrections become necessary with respect to the controlled areas, which are defined by dividing lines separating areas of different gray levels created by the structure of the human face.

If the transformation is out of range, the object network informs the operation control system of a need for the constraint processing, i.e., a need for the corrections. In response, the operation control system makes a request to an object network for correcting the controlled areas after identifying this object network based on the verb objects (branches) of the target object network. At this time, the operation control system, as described in connection with FIG. 22, conducts the operation control for checking whether the preparation of the object network is already made for correcting the controlled areas according to the temporal constraint processing.

After the preparation is completed, the object network is activated to correct the controlled areas. Since constraint conditions such as those for indicating controlled areas are necessary, these constraints are requested of the operation control system. The operation control system obtains these conditions through the modal constraint processing by interacting with the user via the manager window on the display. In this manner, the operation control system conducts the operation control for supplying the conditions necessary for an execution.

Data which the operation control system should handle in playing a role of an interface between the user and the service modules is as follows:

a name of a service requested by a user (this name can be either a specific name of an object, a name of an object network, or a name of a role), data (constraints) necessary for an execution of the requested service, a name of an object network on which the user is working, a name of a current node, one who is in charge (user or service module), a name of a service module for creating the constraints, a flag for checking whether the server is in a condition for operation, and a flag for checking whether all the necessary data is present for executing the requested service.

The data listed above is a minimum set required for the operation control system to serve general purposes. In what follows, how each of the above data is used in the operation control system will be described.

The name of the requested service is used by the operation control system to identify the service which the user intends to use. By identifying the name of the requested service, the operation control system requests the data management system to supply data necessary for the execution of the service. A check as to whether the service is executable is made by looking up the flag for checking whether the data supplied is sufficient for executing the requested service.

When the data turns out to be insufficient as a result of the check, the modal constraint processing is carried out as previously described by asking the user or the service modules to create or supply the data.

The name of the current node and the name of the object network which the user is currently working on are used in the temporal constraint processing to check whether processing is finished or another processing is in progress on the server. This check is made along with use of the flag for determining whether the server is in a condition for operation.

The data as to who is in charge indicates a worker who creates the data, and is used for obtaining necessary data by making a request for the data when there is missing data. The name of the service module for creating the constraints is used for requesting an appropriate service module to create the data when the one who is in charge is also a service module and cannot fill the missing data on its own.

As described above, the operation control system interacts with the user and the service modules, and serves as an interface system for helping to achieve effective operations of both the user and the service modules. The main control is effected by the two types of constraint processing, i.e., the system constraints and the service constraints, corresponding to the characteristics of the extensible function language Extensible WELL.

In the following, a role playing function and an interaction function will be described. The role playing function and the interaction function have been directly or indirectly described in the previous description, which should be referred to as it becomes necessary.

Figure 24:
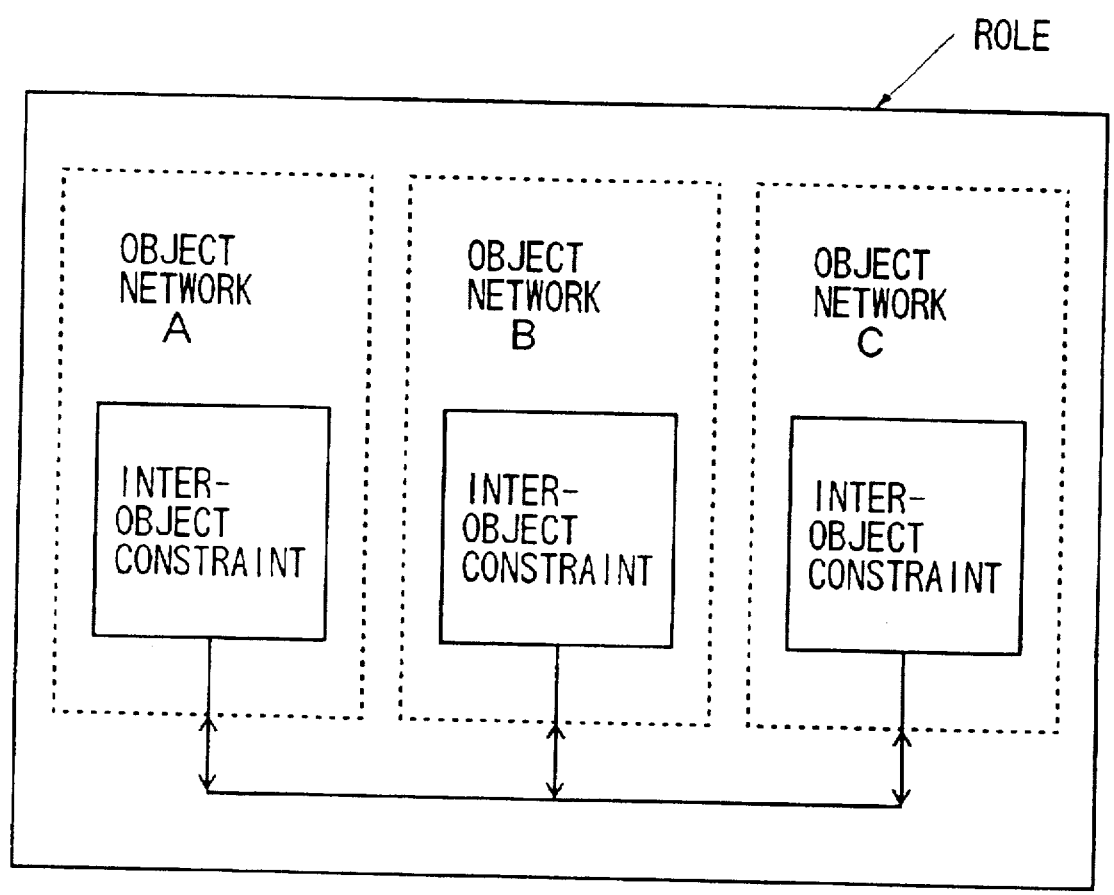
FIG. 24 is an illustrative drawing showing a definition of a role.

FIG. 24 is an illustrative drawing showing a definition of a role. As shown in FIG. 24, a role is defined as a structure of object networks, and is a unit of a function carried out as an execution process. A role is provided with a name, by which reference is made inside and outside the system.

Relations between a plurality of object networks within a given role are provided by constraints defined for objects of each object network, and are defined as relations of attribute values between these objects. In this manner, operations within a given role are achieved as constraint processing. Here, a role may be comprised of a single object network.

In a system of the present invention, there is a need for cooperative operations between roles as a plurality of roles perform execution processing to satisfy the user's needs. To this end, an interaction function should be enhanced, and various communication modes should be provided between these roles.

In order to fulfill the user's intention, further, an effective interaction function should be provided between a user (which can be regarded as one of specific roles) and a system rendering services. As previously described, an interface function between the user and the system is provided by the common platform. The common platform provides a visual interface between mutually connected roles to control collected execution-status data and to communicate with roles which carry out service modules responsive to a situation. In detail, an object network is displayed on the common platform, and, upon an operation thereto, a data window for showing data and constraints are displayed on the common platform along with the object network. After the user feeds values into the data or characteristics into the constraints, the object network carries out execution processing to play an assigned role.

In the system of the present invention, there is a need to provide an effective interaction function between the user and the system and between a plurality of roles. As such an interaction function, functions as shown in the following need to be implemented.

As an event-driven interaction, a client (the user or the agent-role server) makes a request that a noun object on the common platform be created. A system controlling this common platform plays a role of a server, and responds to this request by returning execution results. Namely, when a given role function issues a request command asking for a service from another role function, the latter role function executes the service in response, and responds by returning execution results.

As a data-driven interaction, when values of attributes are not defined in an object template currently treated as a noun object, a request is made that settings be made to attribute values. Here, if a verb object has a generic characteristic, and is in the process of parameter determination, such a verb object is treated as a noun object. When requesting that settings be made to attribute values, a data window is first displayed in response to a situation in which the attribute values are not defined. On this data window, the client (the user or the agent-role server) is requested to define necessary attribute values.

Figure 25:
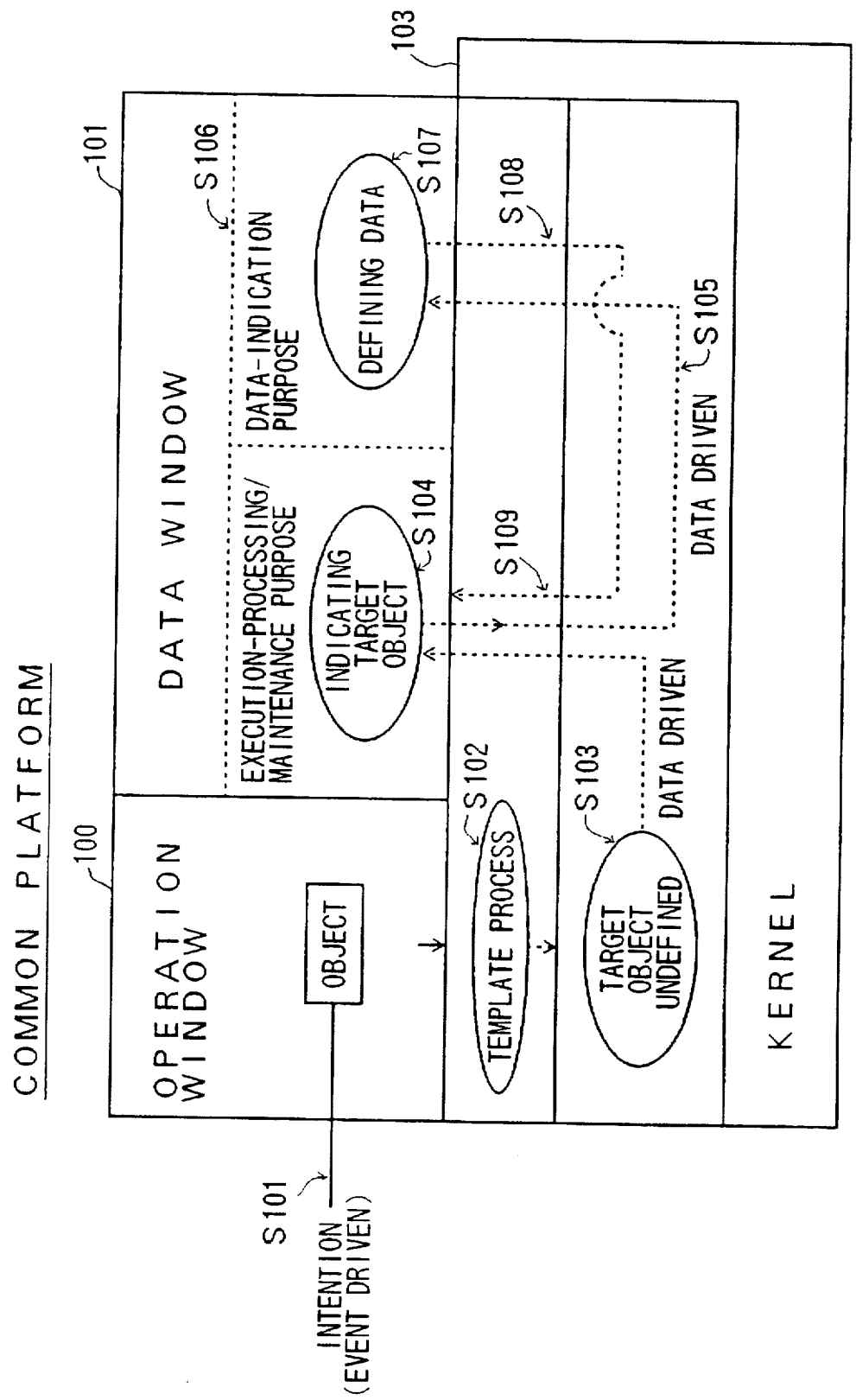
FIG. 25 is an illustrative drawing showing a process flow within the WELL system in order to explain an example of an interaction function based on an event-driven interaction and a data-driven interaction.
Figure 26:
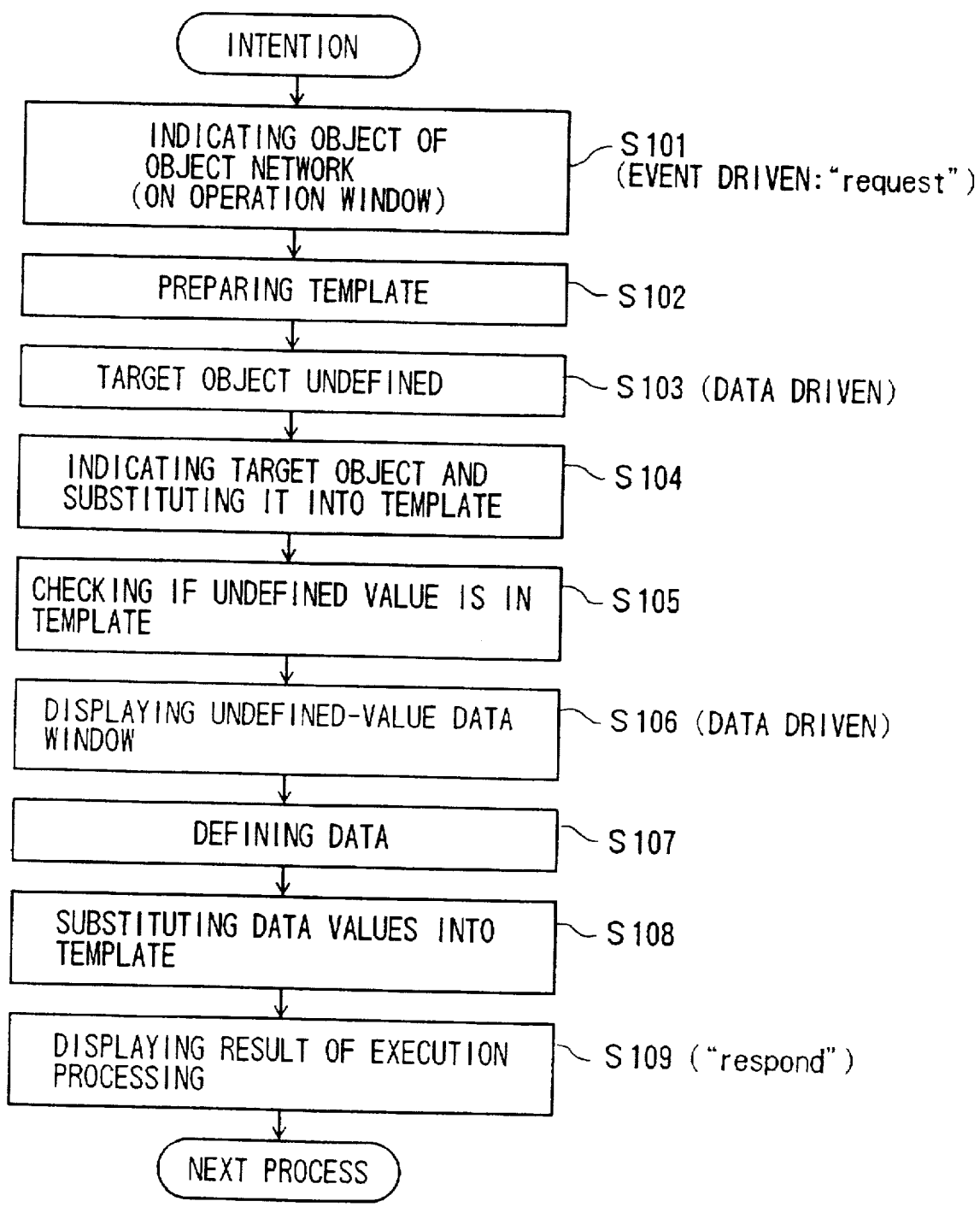
FIG. 26 is an illustrative drawing showing a process flow of an example of an interaction process based on the event-driven interaction and the data-driven interaction.

FIG. 25 is an illustrative drawing showing a process flow within the WELL system 20 (or either 21 or 22) in order to explain an example of an interaction function based on the event-driven interaction and the data-driven interaction. FIG. 26 is an illustrative drawing showing a process flow of an example of an interaction process based on the event-driven interaction and the data-driven interaction.

With reference to FIG. 25 and FIG. 26, a user (or an agent-role server) indicates an object of an object network displayed on an operation window 100 (step S101). This means that the user issues a request according to his/her intention, and corresponds to an event-driven interaction.

In response to an indication of an object by the user, a template is prepared (step S102). If a target object (e.g., an object of a verb) is not defined, a kernel 103 of the WELL system finds that a target object is not defined in the template, and requests an indication of a target object (step S103). This corresponds to a data-driven interaction.

On the data window 101, the user indicates a target object, and substitutes this target object into the template (step S104). The kernel 103 checks whether the template has undefined attribute values (step S105). If there is an undefined attribute value, an undefined-value data window is displayed (step S106). This is a data-driven interaction.

The user defines data which has been undefined on the undefined-value data window of the data window 101 (step S107), and substitutes the data values into the template (step S108). The WELL system carries out execution processing, and displays the execution results on the data window 101 (step S109). This means that the WELL system has responded upon a request from the user.

In this manner, the interaction function based on the event-driven interaction and the data-driven interaction provides an effective and user-friendly interface between the user and the system (the user and the agent-role server), and, also, provides a communication function helping cooperative operations of role functions between a plurality of roles (e.g., between the agent-role server and the specific-role servers). Further, an implementation of the interaction function in the kernel portion of the WELL system allows the present invention to cope with software architectures of various systems including personal computer systems.

When a plurality of roles cooperate with each other, there is a main role which carries out a given role function, and supporting roles provide services to help the main role. Between the main role and the supporting roles, it is preferable to provide an interaction function based on shared data as follows.

The main role carrying out a given role function operates in an environment relating to that main role, and needs to monitor environment data regarding this environment. Such a monitoring function can be delegated to the supporting roles helping the main role. The supporting roles share the environment data with the main role, and informs the main role of a change in the environment data by means of an interruption. In response to the interruption, the main role takes an action to cope with the environmental change.

Figure 27:
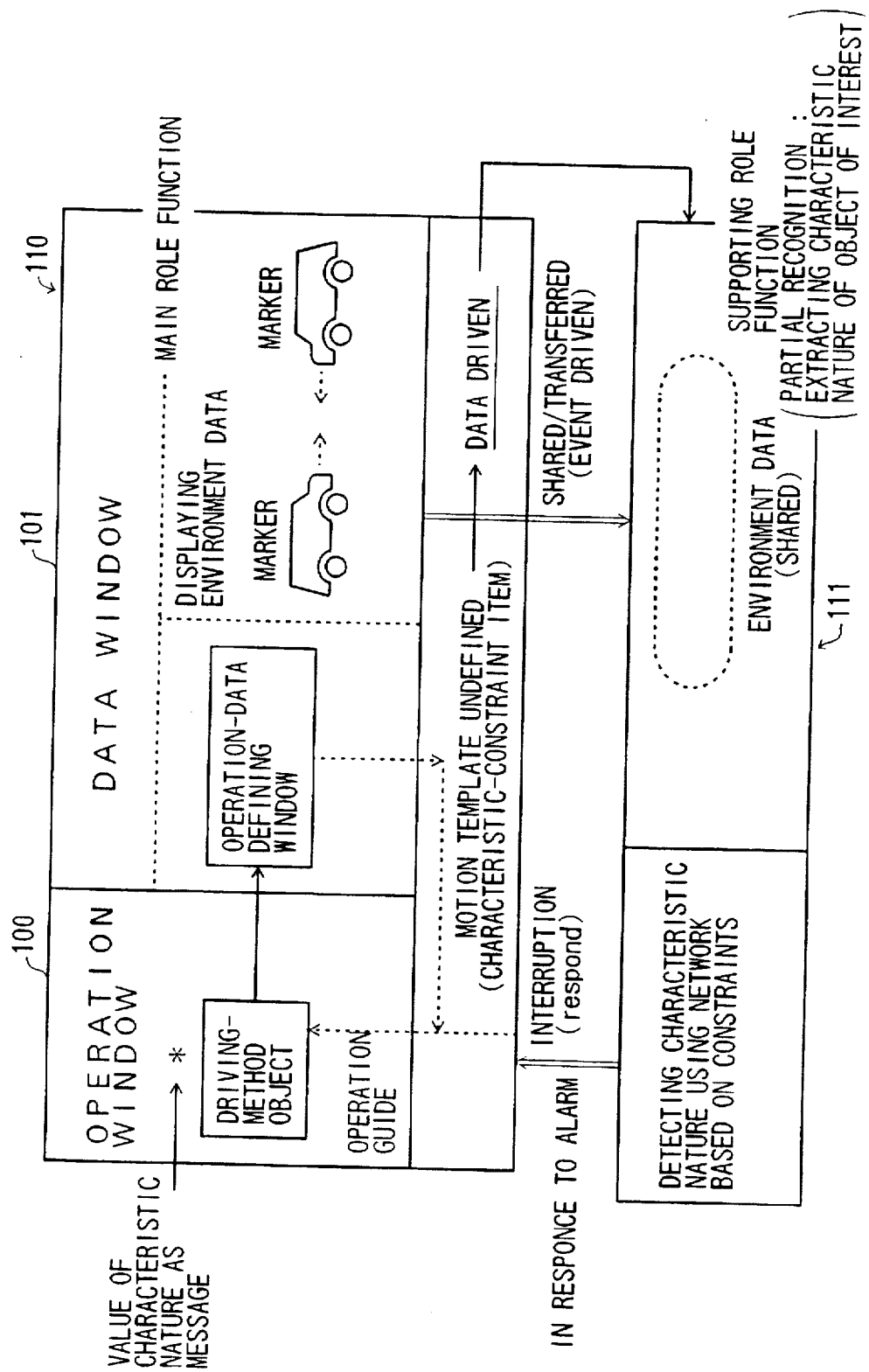
FIG. 27 is an illustrative drawing for explaining an interaction function based on shared data between a main role and supporting roles.

FIG. 27 is an illustrative drawing for explaining an interaction function based on shared data between the main role and the supporting roles.

FIG. 27 shows an example in which two automobiles are driven half automatically. Each of the automobiles is equipped with the system of the present invention, and is set on a collision course. A main role 110 built in one of the automobiles has a driving-method object for half automatic driving, and this driving-method object is displayed on the operation window 100 on the common platform of the main role 110. The common platform of the main role 110 also has the data window 101, on which the environment data is displayed. This environment data is transferred from the main role 110 to the supporting role 111 to be shared.

When the environment data upon its change is transferred from the main role 110 to the supporting role 111, the supporting role 111 detects the characteristic nature of the environment data by using the transfer as an event-driven trigger. The detection of the characteristic nature is carried out by a characteristic-nature-detection network which is held by the supporting role 111. In the example of FIG. 27, a characteristic nature is detected to indicate that the two automobiles are coming so close that a collision cannot be avoided unless some action is taken. Upon detecting the characteristic nature, the supporting role 111 sends an interruption to the main role 110 (responds to the event-driven interaction). Having received the interruption, the main role 110 prepares a motion template in accordance with the driving-method object. If an undefined portion exists in the motion template such as in the case in which data is undefined with regard to a direction and amount of movement of the automobile, a setting of the undefined data is requested based on the data-driven interaction. In response to the request for the setting of the undefined data, the supporting role 111 detects a necessary characteristic nature from the environment data, and sends back the requested data. When this data is incorporated into the motion template, the main role 110 starts an interaction with the user in order to prompt user operations using the driving-method object as an operation guide.

In this manner, the environment data regarding the environment of the main role is shared by the main role and the supporting role, and an interaction function based on the event-driven trigger and the interruption is provided between the main role and the supporting role. In this configuration, the supporting role can take on the monitoring function to monitor the environment data of the main role, and can help the main role to carry out the role function.

In order to ensure smooth cooperative operations between a plurality of role functions, the main role function should be able to broadcast to dependent role functions which are in a subordinate position to carry out roles relating to the main role. Here, broadcasting means one-to-many communication.

Figure 28:
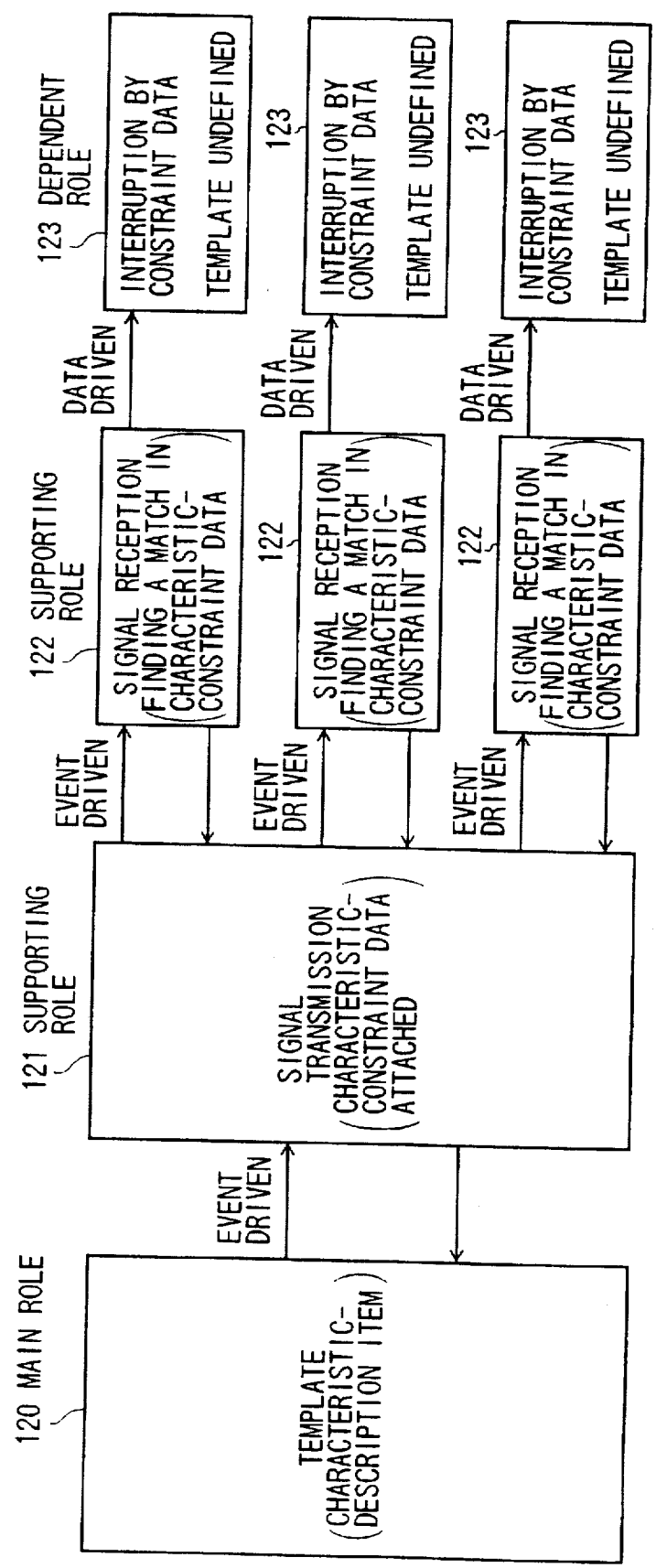
FIG. 28 is an illustrative drawing for explaining broadcasting between a main role function and dependent role functions.

FIG. 28 is an illustrative drawing for explaining broadcasting between the main role function and the dependent role functions.

Assume that when cooperative parallel processing is carried out between a plurality of role functions, during execution of a given main role function, a control characteristic portion relating to relevant role functions is generated. This control characteristic portion can be reflected to control attribute values of other control characteristic portions which are provided on common platforms of these relevant role functions, so that operations of these relevant role functions are controlled by the control characteristic portion generated in connection with the main role. In this manner, the relevant role functions can be positioned as dependent role functions dependent on the main role. What is described here applies in the case in which the relevant role functions are interested in (i.e., related to) the operation of the main role, and a template of an object operated dependently on the main role includes undefined data in the relevant roles.

In FIG. 28, a main role 120 and a plurality of dependent roles 123 cooperatively operate as a collective system. By broadcasting to the plurality of dependent roles 123, the main role 120 controls the dependent roles 123 as data having the same item names as characteristic description items which are defined in a template on the common platform of the main role 120. To this end, a supporting role 121 broadcasts a signal, to which characteristic constraint data is attached, based on an event-driven trigger from the main role 120. A supporting role 122 supporting a respective one of the dependent roles 123 receives the broadcasted signal, and extracts and confirms role-function names of the broadcast origin and characteristic constraint conditions. The dependent roles 123 have a template with an undefined portion, and receive the characteristic constraint data from the supporting role 122 through an interruption of the data-driven interaction. The template is fully defined by the received characteristic constraint data, and the plurality of the dependent roles 123 cooperatively execute and process role functions dependent on the main role 120.

Figure 29:
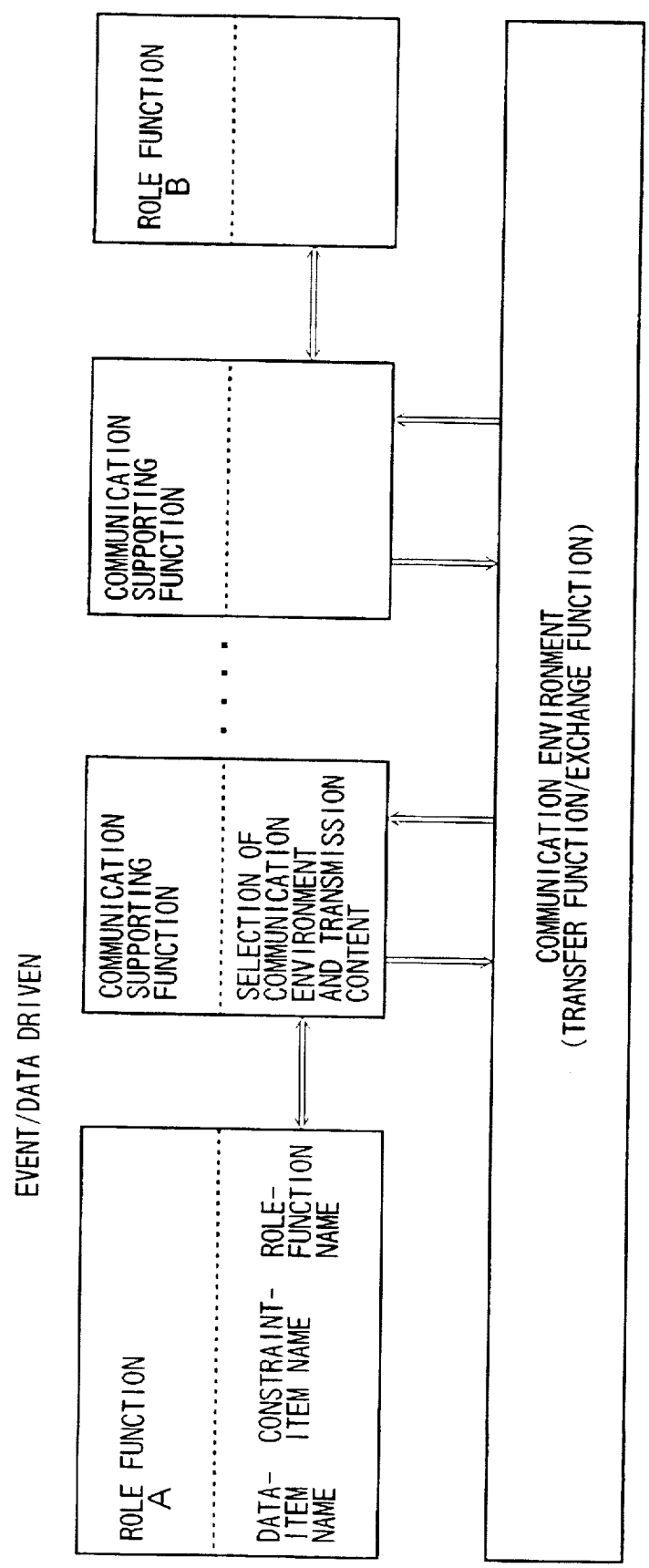
FIG. 29 is an illustrative drawing for explaining communications between role functions.

FIG. 29 is an illustrative drawing for explaining communications between role functions. As shown in FIG. 29, a role function A and a role function B as well as a plurality of role functions which are not explicitly shown in the figure communicate with each other via a communication environment. Between the role function A and the role function B, communication supporting functions are provided in order to support communication. The communication supporting functions are the supporting roles 121 and 122 shown in FIG. 28, for example. An interaction function based on the event-driven interaction and the data-driven interaction effects communication between the role functions, the communication supporting functions, and the communication environment. The communication supporting functions engage in various operations including selecting the communication environment, making settings to transferred contents, etc., to support communication between the role functions A and B.

In the role function A, a name of a counterpart role function is given as the role function B, for example, and, then, content values indicated by data-item names and constraint-item names are transferred to the role function B. In this manner, the contents of execution processing by the role function B are controlled. As for constraints for execution processing by the role function B, constraints before the execution, constraints during the execution, and constraints after the execution are provided to check consistency in cooperative operations. Between a plurality of role functions, a counterpart of communication is not limited to a particular role, but any role can be selected for communication.

As described above, the present invention uses the data models, the object models, the role models, and the process models, and relates these models based on rules mainly comprised of constraints, so that steps of execution processing are defined in a model-driven manner, thereby providing a user-friendly system and allowing the experts to easily design the system.

Further, the data and the constraints are processed by the same processing method, and a process is helped to proceed through exchange of the data and the constraints between the user, the agent-role server, and the specific-role servers. In this manner, unified treatment of the data and the constraints becomes possible, and an interface for helping interaction between the user and the service modules is provided so as to guide the user and the service modules in performing their assigned tasks.

Further, the system constraints are defined by the inter-object relations within the object networks, and a procedure of constraint processing is controlled by the system constraints. By doing so, complicated services can be provided by a simple method.

Also, when experts design the object networks for providing services, the experts can utilize the constraints based on the models stored in the system, so that system development is effectively made.

Further, agent-role servers are organized in a hierarchy, and relations between the upper-level agent-role servers and the lower-level agent-role servers are made equivalent to the relations between the agent-role servers and the specific-role servers. In this manner, a simple configuration can render complex services, and cooperative processing by a system as a whole is achieved based on the constraints.

Further, the present invention is not limited to these embodiments, but various variations and modifications may be made without departing from the scope of the present invention.

What is claimed is:

1. An information processing device for processing information based on object networks, each of which represents data and processing of said data as objects in a graph, comprising:

a data management system controlling a set of data which defines a system hierarchy in terms of relations between data models, object models, role models, and process models, said data models representing attribute-value structures by using template-format schema, said object models representing said objects by dividing said objects into formal models and feature models in a hierarchy based on template formats of said data models, said role models representing a structure body of object networks, said process models each corresponding to an object network which represents noun objects as nodes and verb objects as branches in a graph with a function of a given verb object being applied to a given noun object represented as a given node to obtain a target noun object located down on a branch corresponding to said given verb object; and an operation control system controlling the initiation of processes effecting inter-model connections while checking constraints placed on said models based on said set of data controlled by said data management system.

2. The information processing device as claimed in claim 1, further comprising:

at least one specific-role server for processing information based on an object network which is specifically designed for an individual role; and said operation control system initiates processing of said data and said constraints in a common processing method and requests a service of a user with regard to said data and a service of said specific-role server with regard to said constraints so as to proceed with said processes by obtaining at least one of said data and said constraints in response to said request.

3. The image processing device as claimed in claim 1, wherein said operation control system defines said constraints, based on inter-object relations within said object networks, and controls a procedure of processing said constraints.

4. The information processing device as claimed in claim 3, wherein:

said constraints comprise:

AND constraints which are constraints between attribute values of said noun objects and indicate that a transition to a next state cannot be made unless all necessary attribute values are obtained, OR constraints which are constraints between said verb objects originating from a given noun object and indicate that said verb objects are independent of each other and can be processed in parallel, and hierarchical constraints indicating that, according to relations between upper-level objects and lower-level objects in terms of a processing procedure of said object networks, a set of attribute values of said upper-level objects are subjected to matching operations after operations are newly performed on said lower-level objects; and said operation control system controls process executions based on said constraints.

5. The image processing device as claimed in claim 3, further comprising a display displaying information on said constraints based on said models so as to make said constraints available to experts when said experts design object networks for providing services, wherein said process models are defined based on designs of new constraints which are created based on said displayed constraints.

6. The image processing device as claimed in claim 1, wherein said data management system and said operation control system make up an agent-role server, and a plurality of agent-role servers are organized in a model hierarchy, in which upper-level agent-role servers regard lower-level agent-role servers as specific-role servers, and said agent-role servers control said specific-role servers based on said model hierarchy.

7. An information processing system for processing information based on object networks, each of which represents data and processing of said data as objects in a graph, comprising:

a kernel which selects one of an event-driven interaction and a data-driven interaction as a driving method based on said object networks for controlling processes and status data indicating status of said processes when a plurality of said processes cooperatively operate; and an operation control system controlling said processes to proceed through a series of said event-driven interaction and said data-driven interaction by successively effecting a cooperative operation between said processes using a selected driving method.

8. The information processing system as claimed in claim 7, wherein said operation control system guides interactions between a user and said information processing system based on said series of said event-driven interactions and said data-driven interactions by treating said user as one of said processes when said user operates said information processing system.

9. An information processing system for processing information based on object networks, each of which represents data and processing of said data as objects in a graph, comprising:

a data management system controlling a plurality of roles, each of which is a structure of object networks and serves as a unit of processing when executing a corresponding role; and an operation control system controlling communication based on event-driven interaction and data-driven interaction between any one of said roles when said roles cooperatively operate.

10. The information processing system as claimed in claim 9, wherein each of said roles is supported by a communication supporting role which is a role having a function to support said communication.

11. The information processing system as claimed in claim 9, wherein said plurality of roles comprise a main role and supporting roles for supporting an operation of said main role, said main role and said supporting roles sharing environment data regarding an environment in which said main role operates.

12. The information processing system as claimed in claim 9, wherein each of said plurality of roles further comprises a broadcasting function for conducting a one-to-many communication.

* * * * *

UNITED STATES PATENT AND TRADEMARK OFFICE
CERTIFICATE OF CORRECTION

PATENT NO.: 5,895,459
DATED : April 20, 1999
INVENTOR(S): Hajime ENOMOTO

It is certified that error appears in the above-identified patent and that said Letters Patent is hereby corrected as shown below:

Col. 6, line 56, change "a" to --$\alpha$--.

Col. 16, line 6, change "P" to --$\beta$--.

Signed and Sealed this

Twelfth Day of October, 1999

Attest:

Q. TODD DICKINSON

Attesting Officer

Acting Commissioner of Patents and Trademarks